(12) United States Patent
Noda et al.

(10) Patent No.: US 11,373,295 B2
(45) Date of Patent: Jun. 28, 2022

(54) DISPLACEMENT MEASUREMENT DEVICE AND DISPLACEMENT MEASUREMENT METHOD

(71) Applicant: Panasonic Intellectual Property Management Co., Ltd., Osaka (JP)

(72) Inventors: Akihiro Noda, Osaka (JP); Taro Imagawa, Osaka (JP); Hiroya Kusaka, Hyogo (JP); Yuki Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 17/126,727

(22) Filed: Dec. 18, 2020

(65) Prior Publication Data

US 2021/0104032 A1    Apr. 8, 2021

Related U.S. Application Data

(63) Continuation of application No. PCT/JP2019/028739, filed on Jul. 23, 2019.

(30) Foreign Application Priority Data

Aug. 30, 2018   (JP) .............................. JP2018-161936

(51) Int. Cl.
  *G06K 9/00*        (2022.01)
  *G06T 7/00*        (2017.01)
  (Continued)

(52) U.S. Cl.
  CPC .............. *G06T 7/001* (2013.01); *G01B 11/16* (2013.01); *G06T 5/002* (2013.01); *G06T 7/20* (2013.01);
  (Continued)

(58) Field of Classification Search
  CPC ........... G06T 7/001; G06T 5/002; G06T 7/20; G06T 2207/20081; G06T 2207/30108;
  (Continued)

(56) References Cited

U.S. PATENT DOCUMENTS

2006/0203912 A1    9/2006  Kodama
2009/0190809 A1*   7/2009  Han ..................... G06V 10/755
                                                            382/128

(Continued)

FOREIGN PATENT DOCUMENTS

JP      2006-254349         9/2006
JP      2018-28439  A  *    2/2018

OTHER PUBLICATIONS

International Search Report dated Sep. 10, 2019 in International (PCT) Application No. PCT/JP2019/028739.

*Primary Examiner* — Samir A Ahmed
(74) *Attorney, Agent, or Firm* — Wenderoth, Lind & Ponack, L.L.P.

(57) ABSTRACT

A displacement measurement device includes: a first machine learning model trained to generate, from one image which contains a subject and has noise, at least one image which contains the subject and which has noise or has had noise removed; a first obtainer that obtains a first image which contains the subject and has noise and a second image which contains the subject and has noise; a first generator that, using the first machine learning model, generates M template images containing the subject from the first image and generates M target images containing the subject from the second image, M being an integer of 2 or higher; a hypothetical displacement calculator that calculates M hypothetical displacements of the subject from the M template images and the M target images; and a displacement calculator that calculates a displacement of the subject by (Continued)

performing statistical processing on the M hypothetical displacements.

6 Claims, 18 Drawing Sheets

(51) Int. Cl.
    *G01B 11/16*     (2006.01)
    *G06T 5/00*     (2006.01)
    *G06T 7/20*     (2017.01)

(52) U.S. Cl.
    CPC .............. *G06T 2207/20081* (2013.01); *G06T 2207/30108* (2013.01)

(58) Field of Classification Search
    CPC ... G01B 11/16; G01M 5/0041; G01M 5/0075; G01M 5/0091; E01D 22/00; G01C 11/12
    See application file for complete search history.

(56) References Cited

U.S. PATENT DOCUMENTS

| | | | | |
|---|---|---|---|---|
| 2016/0040984 A1* | 2/2016 | Byrne | .................... | G06T 7/507 |
| | | | | 348/92 |
| 2018/0061063 A1* | 3/2018 | Buyukozturk | ............ | G06T 7/20 |
| 2020/0348411 A1* | 11/2020 | Tanaka | ................ | G01S 13/9023 |

\* cited by examiner

DISPLACEMENT MEASUREMENT DEVICE AND DISPLACEMENT MEASUREMENT METHOD

CROSS REFERENCE TO RELATED APPLICATIONS

This application is a U.S. continuation application of PCT International Patent Application Number PCT/JP2019/028739 filed on Jul. 23, 2019, claiming the benefit of priority of Japanese Patent Application Number 2018-161936 filed on Aug. 30, 2018, the entire contents of which are hereby incorporated by reference.

BACKGROUND

1. Technical Field

The present disclosure relates to a displacement measurement device and a displacement measurement method that detect displacement of a subject to be measured.

2. Description of the Related Art

Techniques which use first and second images in which a subject to be measured has been captured to measure displacement of that subject have been known for some time (see, for example, Japanese Unexamined Patent Application Publication No. 2006-254349).

When capturing an image of the subject to be measured, noise caused by fluctuations in the atmosphere of the space between an image capturing device and the subject due to heat, wind, or the like, noise caused by water droplets falling during rainfall, and the like may appear in the captured image.

According to the past technique, when measuring the displacement of a subject, the accuracy of the measurement will be lower if the image used for the measurement contains noise than if the image does not contain noise.

Accordingly, an object of the present disclosure is to provide a displacement measurement device and a displacement measurement method that, when measuring the displacement of a subject from first and second images of the subject which contain noise, can measure the displacement with a higher level of accuracy than in the past.

SUMMARY

A displacement measurement device according to one aspect of the present disclosure includes: a first machine learning model trained to generate, from one image which contains a subject to be measured and has noise, at least one image which contains the subject and which has noise or has had noise removed; a first obtainer that obtains a first image which contains the subject and has noise and a second image which contains the subject and has noise; a first generator that, using the first machine learning model, generates M template images containing the subject from the first image and generates M target images containing the subject from the second image, M being an integer of 2 or higher; a hypothetical displacement calculator that calculates M hypothetical displacements of the subject from the M template images and the M target images; and a displacement calculator that calculates a displacement of the subject by performing statistical processing on the M hypothetical displacements.

Additionally, a displacement measurement method according to one aspect of the present disclosure includes: obtaining a first image which contains a subject to be measured and has noise and a second image which contains the subject and has noise; generating M template images which contain the subject from the first image, and M target images which contain the subject from the second image, using a first machine learning model trained to generate at least one image which contains the subject and which has noise or has had noise removed from one image which contains the subject and has noise, M being an integer of 2 or higher; calculating M hypothetical displacements of the subject from the M template images and the M target images; and calculating a displacement of the subject by performing statistical processing on the M hypothetical displacements.

With the displacement measurement device and displacement measurement method according to one aspect of the present disclosure, when measuring the displacement of a subject from first and second images of the subject which contain noise, the displacement can be measured with a higher level of accuracy than in the past.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Background Leading to Realization of One Embodiment of the Present Disclosure

When using first and second images in which a subject to be measured is captured to measure displacement of that subject, the displacement obtained as a result of the measurement may differ between a situation where there is noise in the images and a situation where there is no noise in the images. Here, noise caused by fluctuations in the atmosphere of the space between an image capturing device and the subject due to heat, wind, or the like, noise caused by water droplets falling during rainfall, and the like are conceivable as noise which may appear in an image.

Figure 1A:
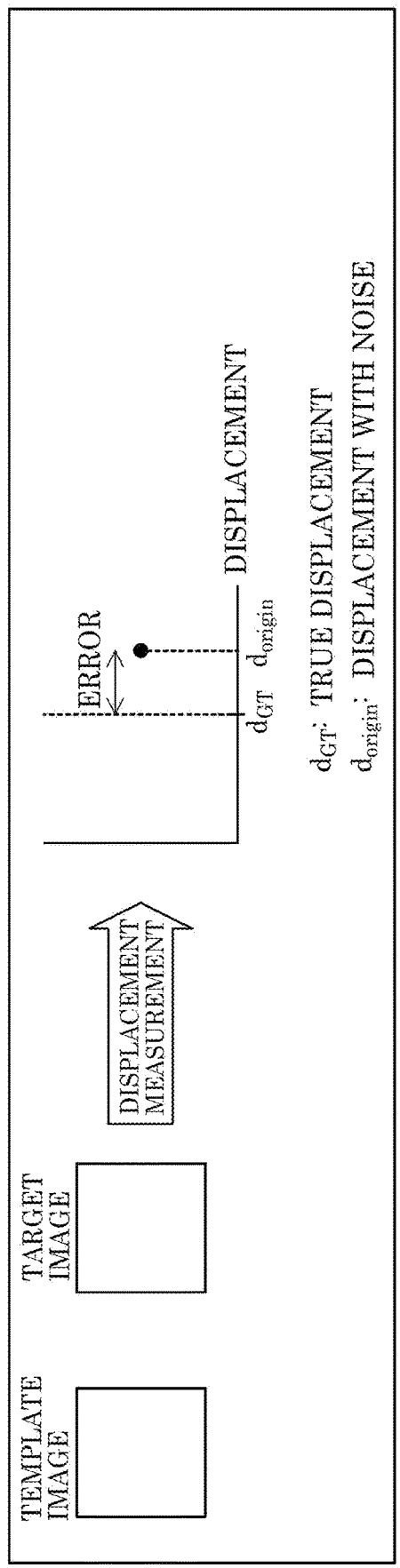
FIG. 1A is a conceptual diagram schematically illustrating an example of a relationship between true displacement and displacement with noise.

FIG. 1A is a conceptual diagram schematically illustrating an example of a relationship between displacement of the subject obtained as a result of measurement from images which do not contain noise (also called "true displacement" hereinafter) and displacement of the subject obtained as a result of measurement from images which do contain noise (also called "displacement with noise" hereinafter).

As illustrated in FIG. 1A, a displacement with noise obtained from a single template image captured with noise and a single target image captured with noise may contain error with respect to the true displacement.

The inventors believed that the single images captured with noise are merely images captured at an instant where a single given pattern of noise, out of a variety of possible noise patterns, is present. The inventors furthermore thought that if a plurality of template images having noise in a variety of possible noise patterns could be reproduced from the single template image captured with noise, and a plurality of target images having noise in a variety of possible noise patterns could be reproduced from the single target image captured with noise, then a plurality of displacements with noise corresponding to the variety of possible noise patterns could be reproduced as well. The inventors postulated that the true displacement could be restored by performing statistical processing on the reproduced plurality of displacements with noise.

Figure 1B:
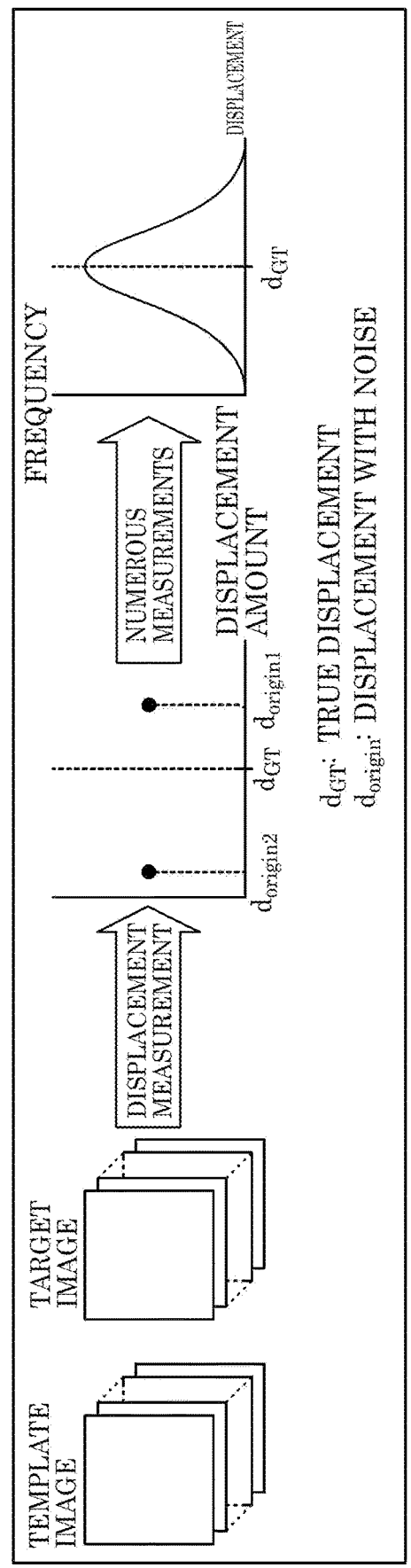
FIG. 1B is a conceptual diagram schematically illustrating the reproduction of true displacement from a plurality of template images containing noise and a plurality of target images containing noise.

FIG. 1B is a conceptual diagram schematically illustrating the reproduction of a true displacement from a plurality of template images containing noise and a plurality of target images containing noise.

As illustrated in FIG. 1B, when a plurality of displacements with noise represent a statistical distribution (e.g., a Gaussian distribution) with respect to the true displacement, the true displacement can be reproduced by performing statistical processing on the plurality of displacements with noise.

The inventors arrived at the displacement measurement device and displacement measurement method described below based on the foregoing ideas.

A displacement measurement device according to one aspect of the present disclosure includes: a first machine learning model trained to generate, from one image which contains a subject to be measured and has noise, at least one image which contains the subject and which has noise or has had noise removed; a first obtainer that obtains a first image which contains the subject and has noise and a second image which contains the subject and has noise; a first generator that, using the first machine learning model, generates M template images containing the subject from the first image and generates M target images containing the subject from the second image, M being an integer of 2 or higher; a hypothetical displacement calculator that calculates M hypothetical displacements of the subject from the M template images and the M target images; and a displacement calculator that calculates a displacement of the subject by performing statistical processing on the M hypothetical displacements.

The above-described displacement measurement device generates M template images and M target images from one first original image having noise and one second original image having noise, respectively. Then, the device calculates M hypothetical displacements from the M template images and the M target images, and calculates the displacement of the subject by performing statistical processing on the calculated hypothetical displacements. Thus according to the above-described displacement measurement device, the displacement can be calculated more accurately than by a past type of displacement measurement device which calculates the displacement directly from a first image having noise and a second image having noise, without performing statistical processing.

Additionally, the at least one image generated by the first machine learning model may be an image having noise, and the displacement measurement device may further include: a second obtainer that obtains N images which contain the subject and have noise, N being an integer of 2 or higher; and a first trainer that trains the first machine learning model with each of the N images by using each of the N images as an input and using at least one of N−1 other images as a correct answer. Through this, the first machine learning model can be trained to generate an image having noise.

Additionally, the first machine learning model may include: a second machine learning model trained to generate, from one image which contains the subject and has noise, one noise-removed image which has had noise removed; and a third machine learning model trained to generate, from the one noise-removed image, at least one image which contains the subject and has noise. The second obtainer may further obtain one reference image which contains the subject and does not have noise. The first trainer may train the first machine learning model by training the second machine learning model with each of the N images by using each of the N images as an input and using the one reference image as a correct answer, and training the third machine learning model by using the one reference image as an input and using at least one of N−1 other images as a correct answer. Through this, the first machine learning model can be trained more efficiently.

Additionally, the at least one image generated by the first machine learning model may be an image having had noise removed, and the displacement measurement device may further include: a second obtainer that obtains N images which contain the subject and have noise and one reference image which contains the subject and does not have noise, N being an integer of 2 or higher; and a second trainer that trains the first machine learning model with each of the N images by using each of the N images as an input and using the one reference image as a correct answer. Through this, the first machine learning model can be trained to generate an image that has had noise removed.

Additionally, the first generator may include: an approximate displacement obtainer that obtains an approximate displacement of the subject; a second generator that generates a first pixel-relocated image by relocating at least one pixel of the first image an amount based on the approximate displacement, and generates a second pixel-relocated image by relocating at least one pixel of the second image an amount based on the approximate displacement; and a third generator that, using the first machine learning model, generates the M template images from the first pixel-relocated image and generates the M target images from the second pixel-relocated image. Through this, the displacement can be measured even when there is a relatively high level of displacement.

A displacement measurement method according to one aspect of the present disclosure includes: obtaining a first image which contains a subject to be measured and has noise and a second image which contains the subject and has noise; generating M template images which contain the subject from the first image, and M target images which contain the subject from the second image, using a first machine learning model trained to generate at least one image which contains the subject and which has noise or has had noise removed from one image which contains the subject and has noise, M being an integer of 2 or higher; calculating M hypothetical displacements of the subject from the M template images and the M target images; and calculating a displacement of the subject by performing statistical processing on the M hypothetical displacements.

The above-described displacement measurement method generates M template images and M target images from one first original image having noise and one second original image having noise, respectively. Then, M hypothetical displacements are calculated from the M template images and the M target images, and the displacement of the subject is calculated by performing statistical processing on the calculated hypothetical displacements. Thus according to the above-described displacement measurement method, the displacement can be calculated more accurately than by a past type of displacement measurement method which calculates the displacement directly from a first image having noise and a second image having noise, without performing statistical processing.

Specific examples of the displacement measurement device and displacement measurement method according to aspects of the present disclosure will be described hereinafter with reference to the drawings. Each of the following embodiments describes a specific example of the present disclosure. As such, the numerical values, shapes, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims are considered to be optional constituent elements. Additionally, the drawings are schematic diagrams, and are not necessarily exact illustrations.

Note that these comprehensive or specific aspects of the present disclosure may be realized by a system, a method, an integrated circuit, a computer program, or a computer-readable recording medium such as a CD-ROM, or may be implemented by any desired combination of systems, devices, methods, integrated circuits, computer programs, and recording media.

Embodiment 1

1-1. Overview of Displacement Measurement System

A displacement measurement system that captures a plurality of images of a subject to be measured and calculates a displacement of the subject from the plurality of captured images, and a displacement measurement device included in the displacement measurement system, will be described here.

Figure 2:
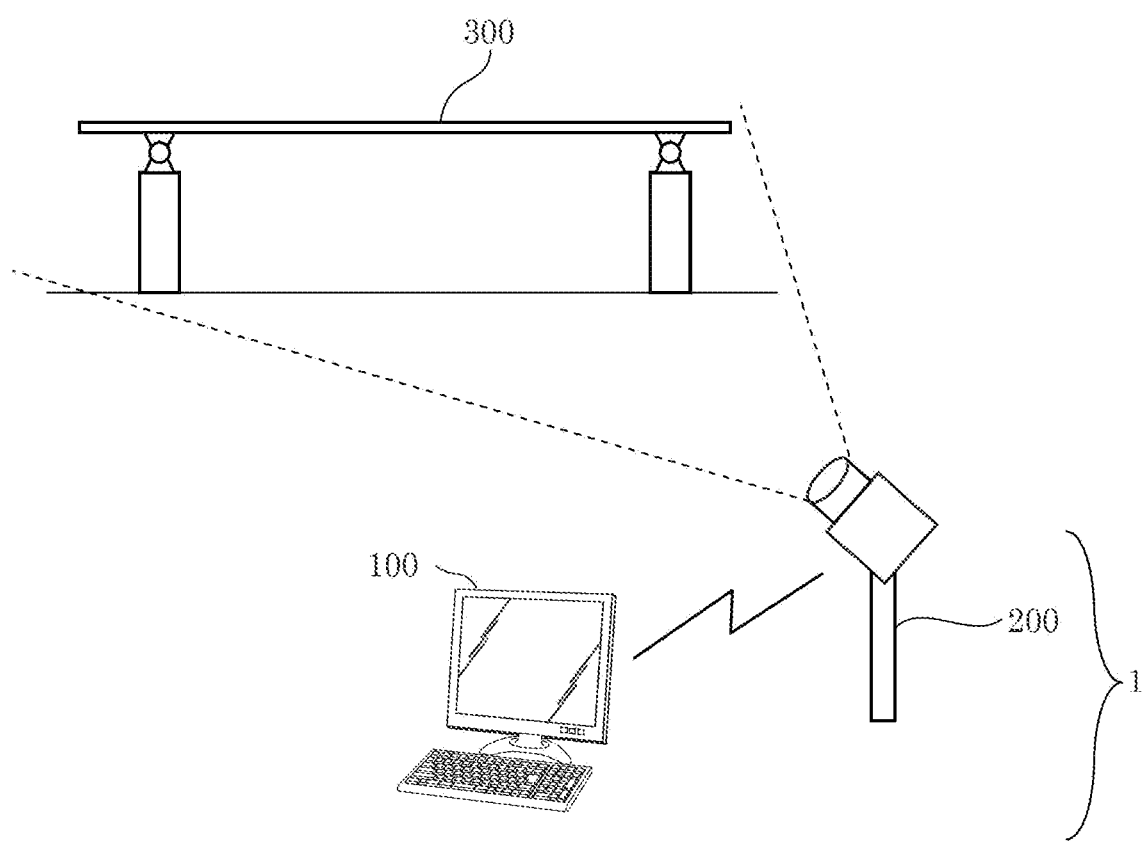
FIG. 2 is an exterior view illustrating an example of the configuration of a displacement measurement system according to Embodiment 1.

FIG. 2 is an exterior view illustrating an example of the configuration of displacement measurement system 1 according to Embodiment 1.

As illustrated in FIG. 2, displacement measurement system 1 is configured including image capturing device 200 and displacement measurement device 100.

Image capturing device 200 captures an image of subject 300, which is a subject to be measured. Image capturing device 200 captures, for example, a plurality of images of subject 300 over time, from a fixed angle of view.

For example, when displacement measurement device 100 is to train first machine learning model 10 (described later), image capturing device 200 captures a plurality of images of subject 300 at a time when there is no displacement in subject 300, i.e., when a load acting on subject 300 is not changing. For example, if subject 300 is a bridge, image capturing device 200 captures a plurality of images at a time when no vehicles are traveling on the bridge.

Additionally, for example, when displacement measurement device 100 is to measure a displacement of subject 300, image capturing device 200 captures a plurality of images of subject 300 during a period in which there is displacement in subject 300 and/or a period in which there is no displacement, i.e., during a period in which a load acting on subject 300 is changing and/or a period in which the load is not changing. In other words, image capturing device 200 captures a plurality of images of subject 300 during a displacement measurement period of displacement measurement device 100. For example, if subject 300 is a bridge, image capturing device 200 captures a plurality of images during a period in which no vehicles are traveling on the bridge and/or a period in which vehicles are traveling on the bridge.

Image capturing device 200 includes a communication function, and communicates with an external device. The external device includes displacement measurement device 100. Image capturing device 200 may communicate with the external device through wired communication, or may communicate with the external device through wireless communication, for example.

Image capturing device 200 is implemented by a digital video camera or a digital still camera including an image sensor, for example.

An image captured by image capturing device 200 may have noise.

Here, noise caused by fluctuations in the atmosphere of the space between an image capturing device and the subject due to heat, wind, or the like, noise caused by water droplets falling during rainfall, and the like are conceivable as noise which may appear in the image.

Displacement measurement device 100 calculates a displacement of subject 300 from a plurality of images, captured by image capturing device 200, which contain subject 300.

Displacement measurement device 100 includes a communication function, and communicates with an external device. The external device includes image capturing device 200. Displacement measurement device 100 may communicate with the external device through wired communication, or may communicate with the external device through wireless communication, for example.

Displacement measurement device 100 is implemented in, for example, a computer device including a processor and memory, by the processor executing a program stored in the memory.

Displacement measurement device 100 will be described in detail next with reference to the drawings.

1-2. Configuration of Displacement Measurement Device 100

Figure 3:
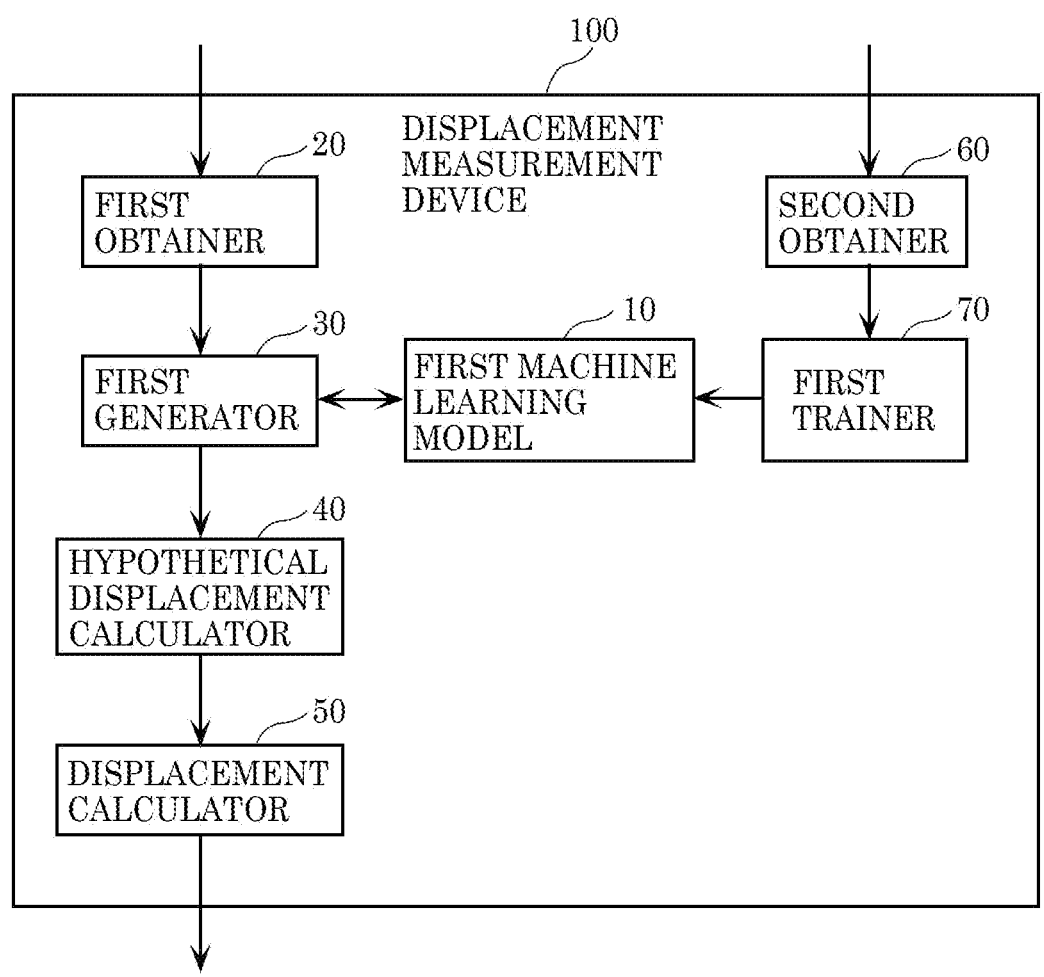
FIG. 3 is a block diagram illustrating the configuration of a displacement measurement device according to Embodiment 1.

FIG. 3 is a block diagram illustrating the configuration of displacement measurement device 100.

As illustrated in FIG. 3, displacement measurement device 100 is configured including first machine learning model 10, first obtainer 20, first generator 30, hypothetical displacement calculator 40, displacement calculator 50, second obtainer 60, and first trainer 70.

First machine learning model 10 is a machine learning model trained to generate at least one image which contains subject 300 and has noise, from one image which contains subject 300 and has noise. First machine learning model 10 is trained by first trainer 70. The training of first machine learning model 10 by first trainer 70 will be described later.

Second obtainer 60 obtains, from image capturing device 200, N (where N is an integer of 2 or higher) images which contain subject 300 and have noise. The N images obtained by second obtainer 60 are used in the training of first machine learning model 10 (described later). The images used in the training of first machine learning model 10 (described later) are, for example, images captured when there is no displacement in subject 300. Accordingly, second obtainer 60 obtains N images captured when there is no displacement in subject 300.

With each of the N images obtained by second obtainer 60, first trainer 70 trains first machine learning model 10 to generate at least one image which contains subject 300 and has noise from one image which contains subject 300 and has noise, by using each of the N images as an input and using at least one of N−1 other images as a correct answer.

Figure 4:
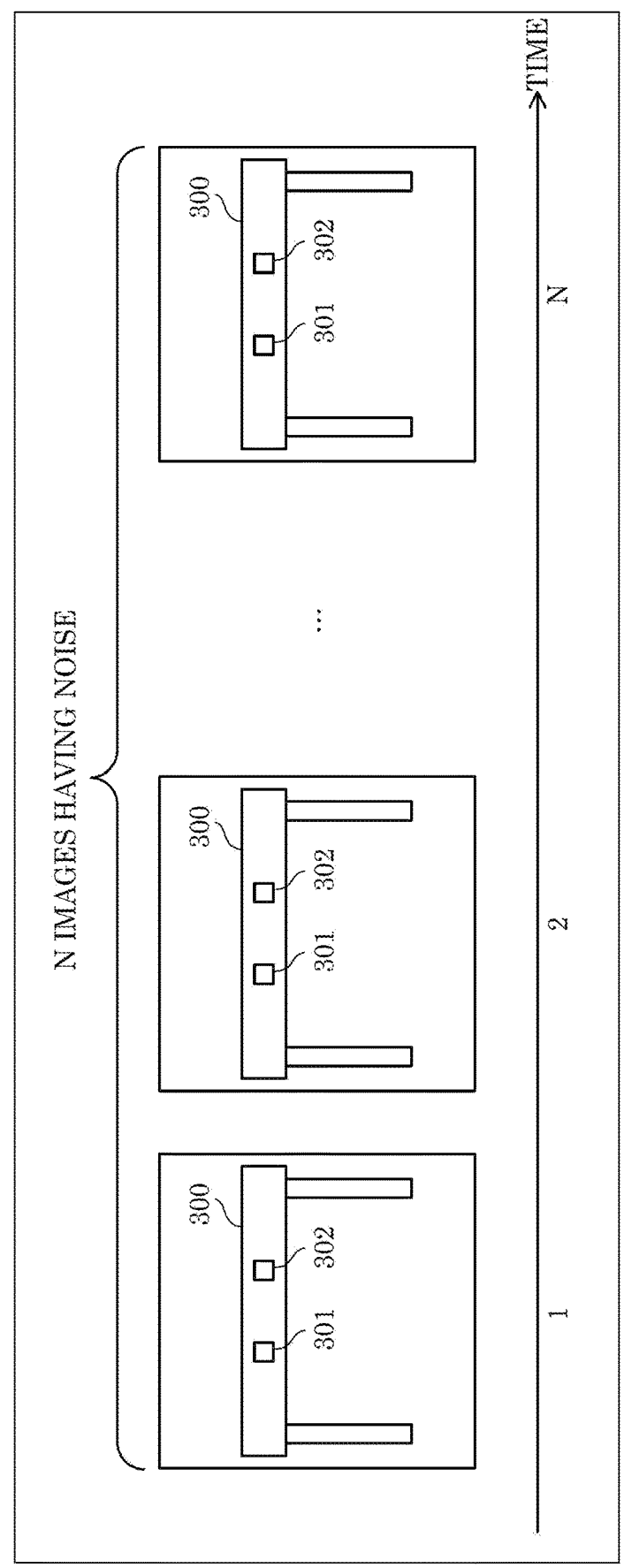
FIG. 4 is a schematic diagram illustrating an example of learning by a first learning model according to Embodiment 1.

FIG. 4 is a schematic diagram illustrating an example of first machine learning model 10 being trained by first trainer 70.

A specific example of the training of first machine learning model 10 by first trainer 70 will be described next with reference to FIG. 4. In this example, image capturing device 200 captures a moving image of subject 300 when there is no displacement in subject 300. i.e., when a load acting on subject 300 is not changing, and second obtainer 60 obtains N frames of the moving image captured by image capturing device 200 as the N images which contain subject 300 and have noise.

As illustrated in FIG. 4, first trainer 70 sets, for each of the N images, at least one measurement point in a pixel region where subject 300 appears. Here, each of the at least one measurement points is a local region constituted by a plurality of pixels adjacent to each other, and is a pixel region in a position that is the same throughout the N images. In the example illustrated in FIG. 4, first trainer 70 sets measurement point 301 and measurement point 302 in each of the N images.

Then, first trainer 70 trains first machine learning model 10 with each of the N images to generate at least one image which contains subject 300 and has noise from one image which contains subject 300 and has noise, by using each of the N images as an input and using at least one of the other N−1 images as a correct answer, and by performing the training on pixels included in each of the measurement points which have been set (measurement point 301 and measurement point 302). Here, first trainer 70 may train first machine learning model 10 on a measurement point-by-measurement point basis, or may train first machine learning model 10 using all measurement points simultaneously, for example.

The following will describe first trainer 70 as training first machine learning model 10 to generate M (where M is an integer of 2 or higher) images which contain subject 300 and have noise. However, as another example, first trainer 70 may train first machine learning model 10 to generate one image which contains subject 300 and has noise from one image which contains subject 300 and has noise, and first machine learning model 10 may generate M images which contain subject 300 and have noise from one image which contains subject 300 and has noise by changing a parameter of first machine learning model 10 M times when generating the image. As still another example, first trainer 70 may train first machine learning model 10 to generate one image which contains subject 300 and has noise from one image which contains subject 300 and has noise, and first machine learning model 10 may generate M images which contain subject 300 and have noise from one image which contains subject 300 and has noise by using a Generative Adversarial Network (GAN) when generating the image.

Returning to FIG. 3, the descriptions of displacement measurement device 100 will be continued.

First obtainer 20 obtains, from image capturing device 200, a first image which contains subject 300 and has noise and a second image which contains subject 300 and has noise. The first image and the second image obtained by first obtainer 20 are used in the calculation of the displacement of subject 300 (described later). As such, first obtainer 20 obtains the first image and the second image which have been captured during a period in which there is displacement in subject 300 and/or a period in which there is no displacement.

Using first machine learning model 10, first generator 30 generates M template images which contain subject 300 and have noise from the first image obtained by first obtainer 20, and generates M target images which contain subject 300 and have noise from the second image obtained by first obtainer 20.

Figure 5:
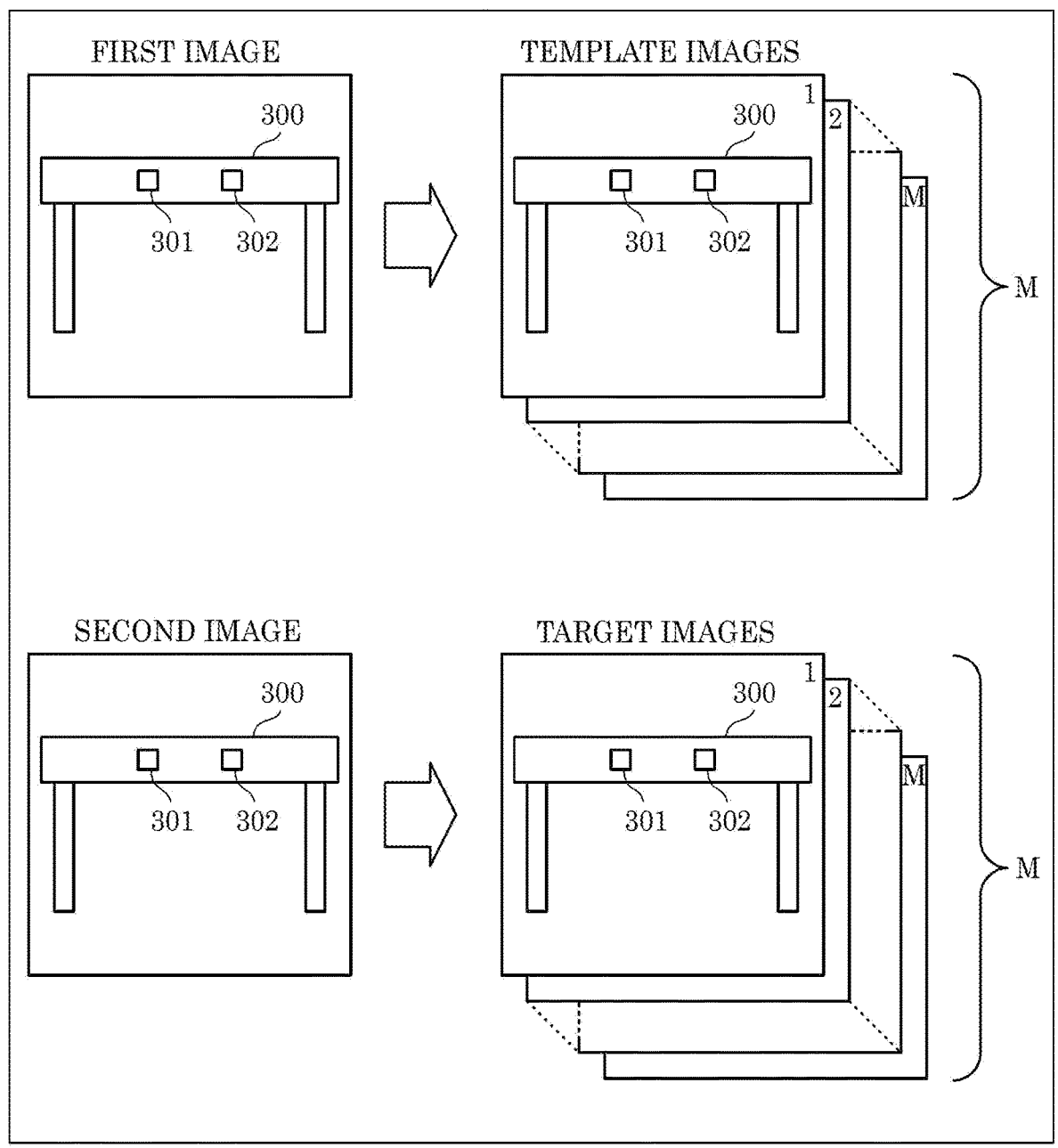
FIG. 5 is a schematic diagram illustrating an example of a first generator according to Embodiment 1 generating M template images and M target images.

FIG. 5 is a schematic diagram illustrating an example of first generator 30 generating the M template images which have noise from the first image which has noise, and generating the M target images which have noise from the second image which has noise, using first machine learning model 10.

A specific example of the generation of the M template images from the first image and the generation of the M target images from the second image, performed by first generator 30 using first machine learning model 10, will be described next with reference to FIG. 5. In this example, image capturing device 200 captures a moving image of subject 300 during a period in which there is displacement in subject 300 and/or a period in which there is no displacement, i.e., during a period in which a load acting on subject 300 is changing and/or a period in which the load is not changing; and first obtainer 20 obtains one frame of the moving image captured by image capturing device 200 as the first image, and another one frame as the second image.

As illustrated in FIG. 5, using first machine learning model 10, first generator 30 generates the M template images which have noise from the first image which has noise, and generates the M target images which have noise from the second image which has noise, using the pixels included in each of the measurement points set by first trainer 70 (measurement point 301 and measurement point 302) as targets of the generation.

Returning to FIG. 3, the descriptions of displacement measurement device 100 will be continued.

Hypothetical displacement calculator 40 calculates M displacements of subject 300 from the M template images which have noise and the M target images which have noise, generated by first generator 30. The M displacements of subject 300 calculated by hypothetical displacement calculator 40 from the M template images and the M target images will be called "M hypothetical displacements of subject 300" hereinafter.

Figure 6:
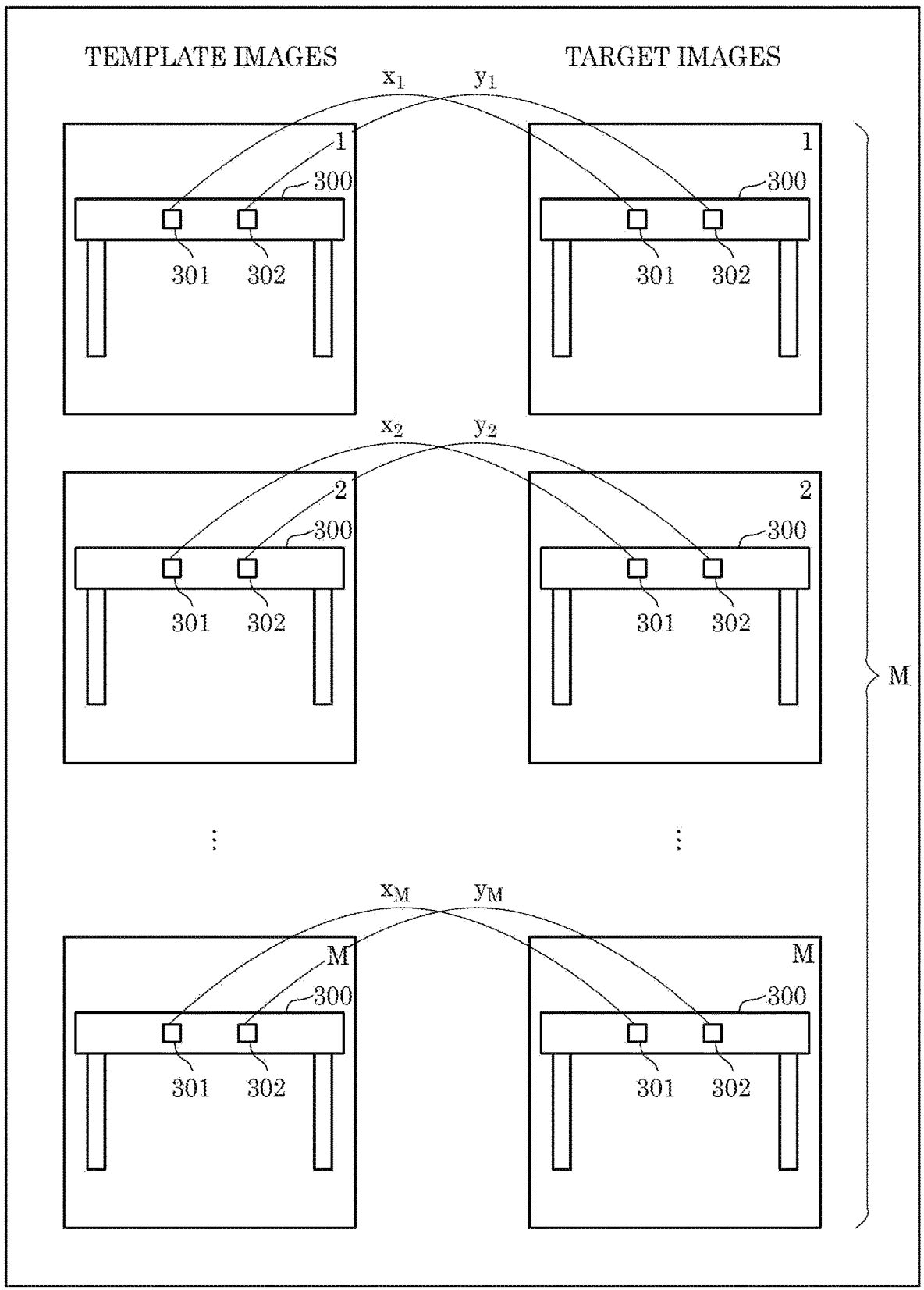
FIG. 6 is a schematic diagram illustrating an example of a hypothetical displacement calculator according to Embodiment 1 calculating M hypothetical displacements.

FIG. 6 is a schematic diagram illustrating an example of hypothetical displacement calculator 40 calculating the M hypothetical displacements from the M template images which have noise and the M target images which have noise.

A specific example of the calculation of the M hypothetical displacements from the M template images and the M target images by hypothetical displacement calculator 40 will be described next with reference to FIG. 6.

As illustrated in FIG. 6, hypothetical displacement calculator 40 associates the M template images which have noise one-to-one with the M target images which have noise to create M pairs of images. Then, for each pair, hypothetical displacement calculator 40 calculates a displacement of subject 300 in the template image and the target image as the hypothetical displacement, performing the calculation on each of the measurement points set by first trainer 70 (measurement point 301 and measurement point 302). Through this, hypothetical displacement calculator 40 calculates the M hypothetical displacements of subject 300 at each of the measurement points. In this example, hypothetical displacement calculator 40 calculates $x_1, x_2, \ldots, x_M$ as the hypothetical displacements of subject 300 at measurement point 301, and calculates $y_1, y_2, \ldots, y_M$ as the hypothetical displacements of subject 300 at measurement point 302.

Hypothetical displacement calculator 40 may calculate the displacement of subject 300 in the template image and the target image in each pair using, for example, digital image correlation, or using, for example, a sampling moiré method.

Hypothetical displacement calculator 40 may calculate a number of pixels in the images as the hypothetical displacement, for example, or may calculate a distance in real space as the hypothetical displacement, for example.

Returning to FIG. 3, the descriptions of displacement measurement device 100 will be continued.

Displacement calculator 50 calculates the displacement of subject 300 by performing statistical processing on the M hypothetical displacements calculated by hypothetical displacement calculator 40.

Figure 7:
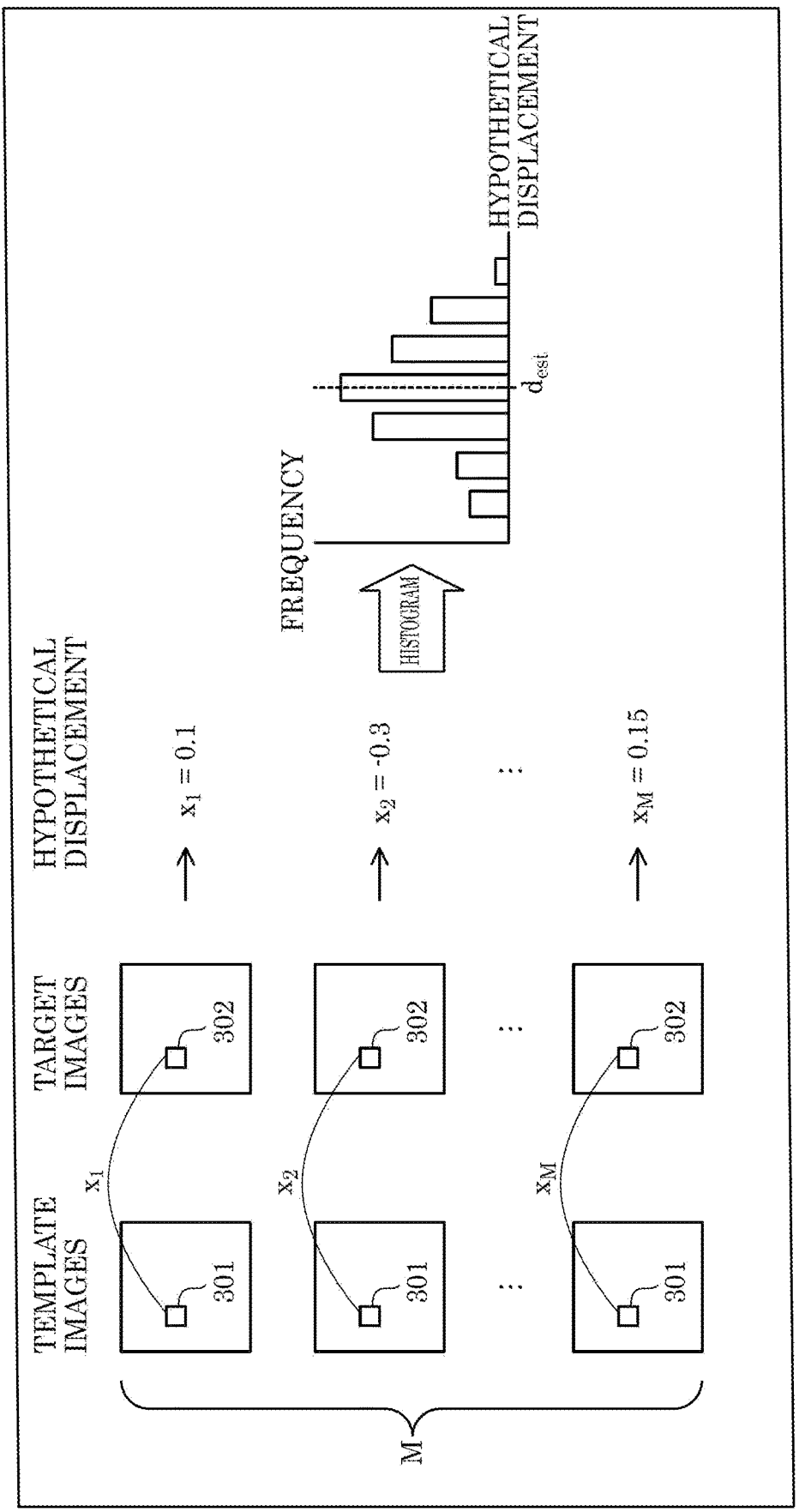
FIG. 7 is a schematic diagram illustrating an example of a displacement calculator according to Embodiment 1 calculating a displacement.

FIG. 7 is a schematic diagram illustrating an example of displacement calculator 50 calculating the displacement of subject 300 by performing statistical processing on the M hypothetical displacements.

A specific example of the calculation of the displacement of subject 300 by displacement calculator 50 will be described hereinafter with reference to FIG. 7. Although the following will describe an example in which displacement calculator 50 calculates the hypothetical displacement of subject 300 at measurement point 301, the same applies to a case where the hypothetical displacement of subject 300 is calculated at measurement point 302.

As illustrated in FIG. 7, displacement calculator 50 generates a histogram for the M hypothetical displacements of subject 300 at measurement point 301 which have been calculated by hypothetical displacement calculator 40. The hypothetical displacement with the highest frequency is then specified from the histogram, and the specified hypothetical displacement is calculated as the displacement of subject 300 at measurement point 301. However, as another example, displacement calculator 50 may calculate, for example, an average value of the M hypothetical displacements of subject 300 at measurement point 301 which have been calculated by hypothetical displacement calculator 40, and use the calculated average value as the displacement of subject 300 at measurement point 301; or, for example, may calculate a median value and use the calculated median value as the displacement of subject 300 at measurement point 301; or, for example, may calculate a trimmed mean and use the calculated trimmed mean as the displacement of subject 300 at measurement point 301. As still another example, displacement calculator 50 may perform fitting using an appropriate function (e.g., a Gaussian function) on the histogram of the M hypothetical displacements of subject 300 at measurement point 301 which have been calculated by hypothetical displacement calculator 40, and may then calculate the displacement of subject 300 at measurement point 301 on the basis of a result of the fitting.

1-3. Operations of Displacement Measurement Device 100

Operations performed by displacement measurement device 100 configured as described above will be described next.

Displacement measurement device 100 performs first learning processing and first displacement measurement processing. The first learning processing and the first displacement measurement processing performed by displacement measurement device 100 will be described in order hereinafter.

The first learning processing is processing for training first machine learning model 10 to generate at least one image which contains subject 300 and has noise, from one image which contains subject 300 and has noise.

Figure 8:
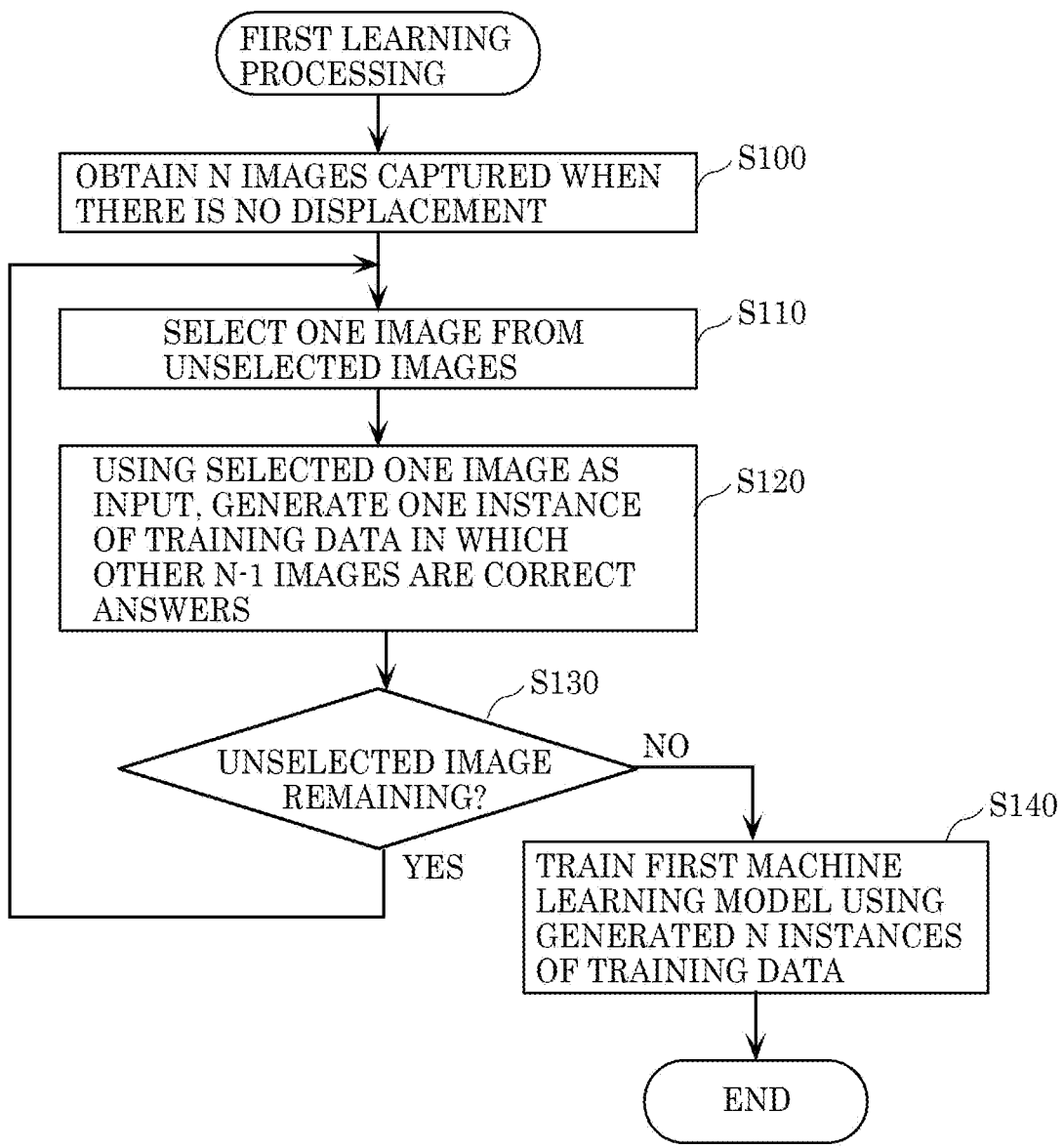
FIG. 8 is a flowchart illustrating first learning processing according to Embodiment 1.

FIG. 8 is a flowchart illustrating the first learning processing performed by displacement measurement device 100.

The first learning processing is started when a user using displacement measurement device 100 has performed an operation in displacement measurement device 100 for starting the first learning processing, when, for example, image capturing device 200 has captured a moving image of subject 300 in which there is no displacement in subject 300 and there is noise in each of the frames constituting the captured moving image.

When the first learning processing is started, second obtainer 60 obtains, from image capturing device 200, N frames of the frames constituting the moving image captured of subject 300, as the N images which contains subject 300 and have noise (step S100). In other words, N images captured when there is no displacement are obtained.

Once the N images having noise have been obtained, first trainer 70 selects one image having noise from among the N unselected images having noise (step S110). Here, "unselected image" refers to an image, in a loop from the process of step S110 to the determination of "yes" in step S130 (described later), which has not been selected in a past instance of the process of step S110.

Once one image having noise has been selected, first trainer 70 generates one instance of training data which takes the one selected image having noise as an input and the other N−1 images having noise as correct answers (step S120).

Once the one instance of training data has been generated, first trainer 70 finds whether or not there is an unselected image among the N images having noise (step S130).

If, in the process of step S130, there is an unselected image (step S130: yes), displacement measurement device 100 moves the sequence to step S110 again.

If, in the process of step S130, there is no unselected image (step S130: no), first trainer 70 uses N instances of training data, obtained by repeating the loop formed by the process of step S110 to the determination of "yes" in step S130 N times, to train first machine learning model 10 to generate at least one image which contains subject 300 and has noise from one image which contains subject 300 and has noise (step S140).

Once the process of step S140 ends, displacement measurement device 100 ends the first learning processing.

The first displacement measurement processing is processing for calculating the displacement of subject 300 from the first image, which contains subject 300 and has noise, and the second image, which contains subject 300 and has noise.

Figure 9:
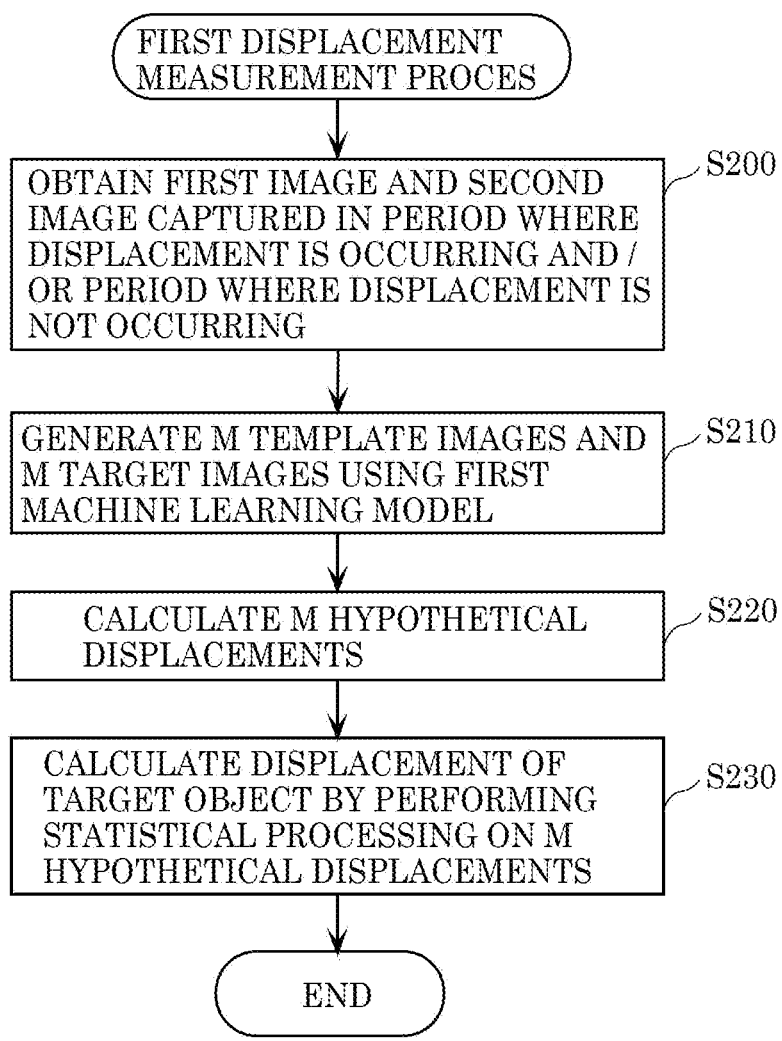
FIG. 9 is a flowchart illustrating first displacement measurement processing according to Embodiment 1.

FIG. 9 is a flowchart illustrating the first displacement measurement processing performed by displacement measurement device 100.

The first displacement measurement processing is started when a user using displacement measurement device 100 has performed an operation in displacement measurement device 100 for starting the first displacement measurement processing, when, for example, image capturing device 200 has captured a moving image of subject 300 during a period in which there is displacement in subject 300 and/or a period in which there is no displacement, and there is noise in each of the frames constituting the captured moving image.

When the first displacement measurement processing is started, first obtainer 20 obtains, from image capturing device 200, one frame among the frames constituting the moving image captured of subject 300 as the first image which contains subject 300 and has noise, and obtains another one frame as the second image which contains subject 300 and has noise (step S200).

Once the first image having noise and the second image having noise have been obtained, first generator 30 generates the M template images which have noise from the first image which has noise, and generates the M target images which have noise from the second image which has noise, using first machine learning model 10 (step S210).

Once the M template images having noise and the M target images having noise have been generated, hypothetical displacement calculator 40 calculates the M hypothetical displacements from the M template images having noise and the M target images having noise (step S220).

Once the M hypothetical displacements have been calculated, displacement calculator 50 calculates the displacement of subject 300 by performing statistical processing on the M hypothetical displacements (step S230).

Once the process of step S230 ends, displacement measurement device 100 ends the first displacement measurement processing.

1-4. Effects

As described above, displacement measurement device 100 generates the M template images which have noise from the first image which has noise, and generates the M target images which have noise from the second image which has noise. Then, displacement measurement device 100 calculates the M hypothetical displacements from the M template images having noise and the M target images having noise, and calculates the displacement of subject 300 by performing statistical processing on the calculated M hypothetical displacements. Accordingly, displacement measurement device 100 can calculate the displacement more accurately than a past type of displacement measurement device which calculates the displacement of subject 300 directly from a first image having noise and a second image having noise, without performing statistical processing.

Embodiment 2

A displacement measurement device according to Embodiment 2, configured by changing part of the configuration of displacement measurement device 100 according to Embodiment 1, will be described next.

The displacement measurement device according to Embodiment 2 will be described hereinafter, focusing on differences from displacement measurement device 100 according to Embodiment 1.

2-1. Configuration of Displacement Measurement Device 400

Figure 10:
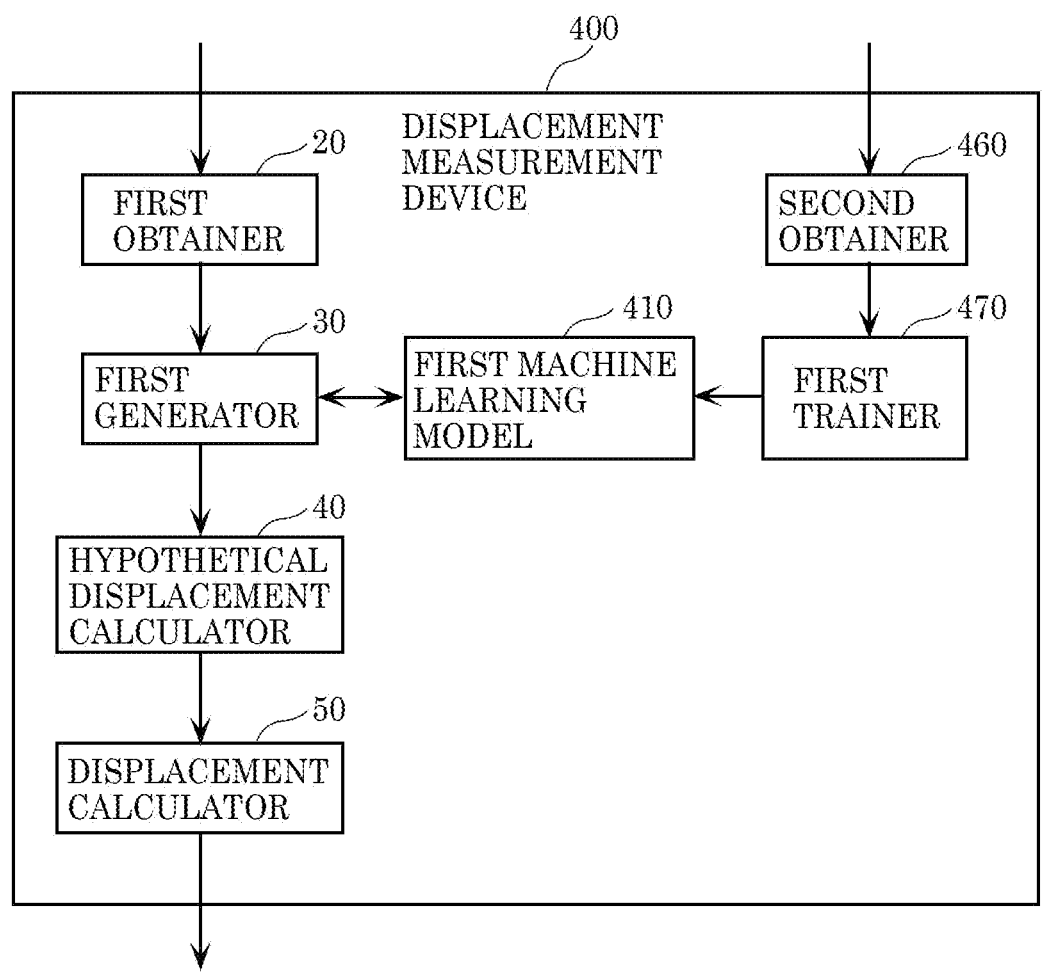
FIG. 10 is a block diagram illustrating the configuration of a displacement measurement device according to Embodiment 2.

FIG. 10 is a block diagram illustrating the configuration of displacement measurement device 400 according to Embodiment 2.

As illustrated in FIG. 10, displacement measurement device 400 is configured by changing displacement measurement device 100 according to Embodiment 1 as follows: first machine learning model 10 has been changed to first machine learning model 410; second obtainer 60 has been changed to second obtainer 460; and first trainer 70 has been changed to first trainer 470.

First machine learning model 410 is a machine learning model trained to generate at least one image which contains subject 300 and has noise, from one image which contains subject 300 and has noise, and is configured including a second machine learning model and a third machine learning model.

Figure 11:
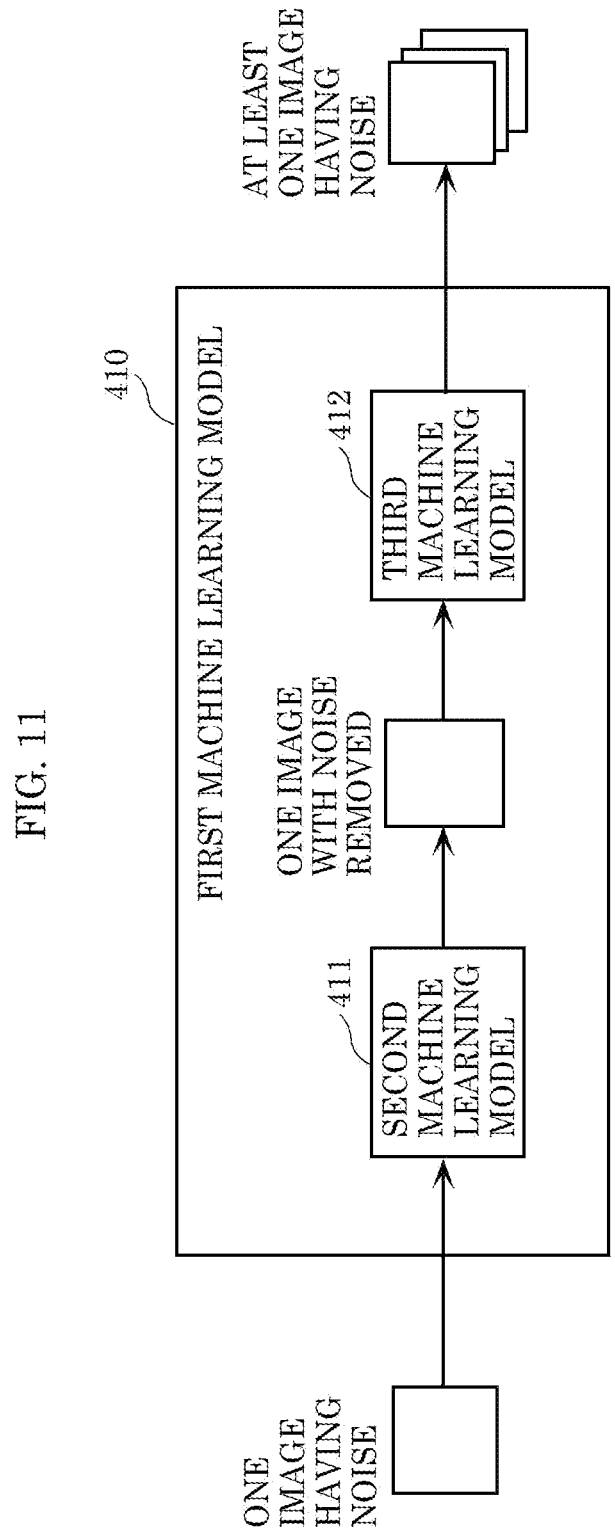
FIG. 11 is a schematic diagram illustrating an example of the configuration of a first machine learning model according to Embodiment 2.

FIG. 11 is a schematic diagram illustrating an example of the configuration of first machine learning model 410.

As illustrated in FIG. 11, first machine learning model 410 is configured including second machine learning model 411 and third machine learning model 412.

Second machine learning model 411 is a machine learning model trained to generate one image which contains subject 300 and has had noise removed, from one image which contains subject 300 and has noise. Second machine learning model 411 is trained by first trainer 470. The training of second machine learning model 411 by first trainer 470 will be described later.

Third machine learning model 412 is a machine learning model trained to generate at least one image which contains subject 300 and has noise, from one image which contains subject 300 and has had noise removed. Third machine learning model 412 is trained by first trainer 470. The training of third machine learning model 412 by first trainer 470 will be described later.

After training, third machine learning model 412 is input with the one image which contains subject 300 and has had noise removed, generated by second machine learning model 411.

Second obtainer 460 obtains, from image capturing device 200, N images which contain subject 300 and have noise, and one reference image which contains subject 300 and has had noise removed (i.e., which has no noise). The N images and the one reference image obtained by second obtainer 460 are used in the training of first machine learning model 410 (described later). The images used in the training of first machine learning model 410 (described later) are, for example, images captured when there is no displacement in subject 300. Accordingly, second obtainer 460 obtains N images and the one reference image captured when there is no displacement in subject 300.

When, for example, it is difficult for image capturing device 200 to capture one image which contains subject 300 and has had noise removed, second obtainer 460 may obtain the one reference image which contains subject 300 and has had noise removed by obtaining an arithmetic mean of N images, obtained from image capturing device 200, which contain subject 300 and have noise. Additionally, second obtainer 460 may obtain the one reference image which contains subject 300 and has had noise removed by, for example, transforming one image containing subject 300, captured by image capturing device 200 in a state where image capturing device 200 has been moved close to subject 300 so that no noise is present, into an image projected at the same angle of view as the N images.

First trainer 470 trains first machine learning model 410 with each of the N images obtained by second obtainer 460 to generate at least one image which contains subject 300 and has noise from one image which contains subject 300 and has noise, by using each of the N images as an input and using at least one of N−1 other images as a correct answer. To be more specific, first trainer 470 trains second machine learning model 411 with each of the N images obtained by second obtainer 460 to generate one image which contains subject 300 and has had noise removed from one image which contains subject 300 and has noise, by using each of the N images as an input and using the one reference image obtained by second obtainer 460 as a correct answer. Then, first trainer 470 trains first machine learning model 410 by training third machine learning model 412 to generate at least one image which contains subject 300 and has noise from one image which contains subject 300 and has had noise removed, using the one reference image obtained by second obtainer 460 as an input and using at least one of the other N−1 images obtained by second obtainer 460 as a correct answer.

Figure 12:
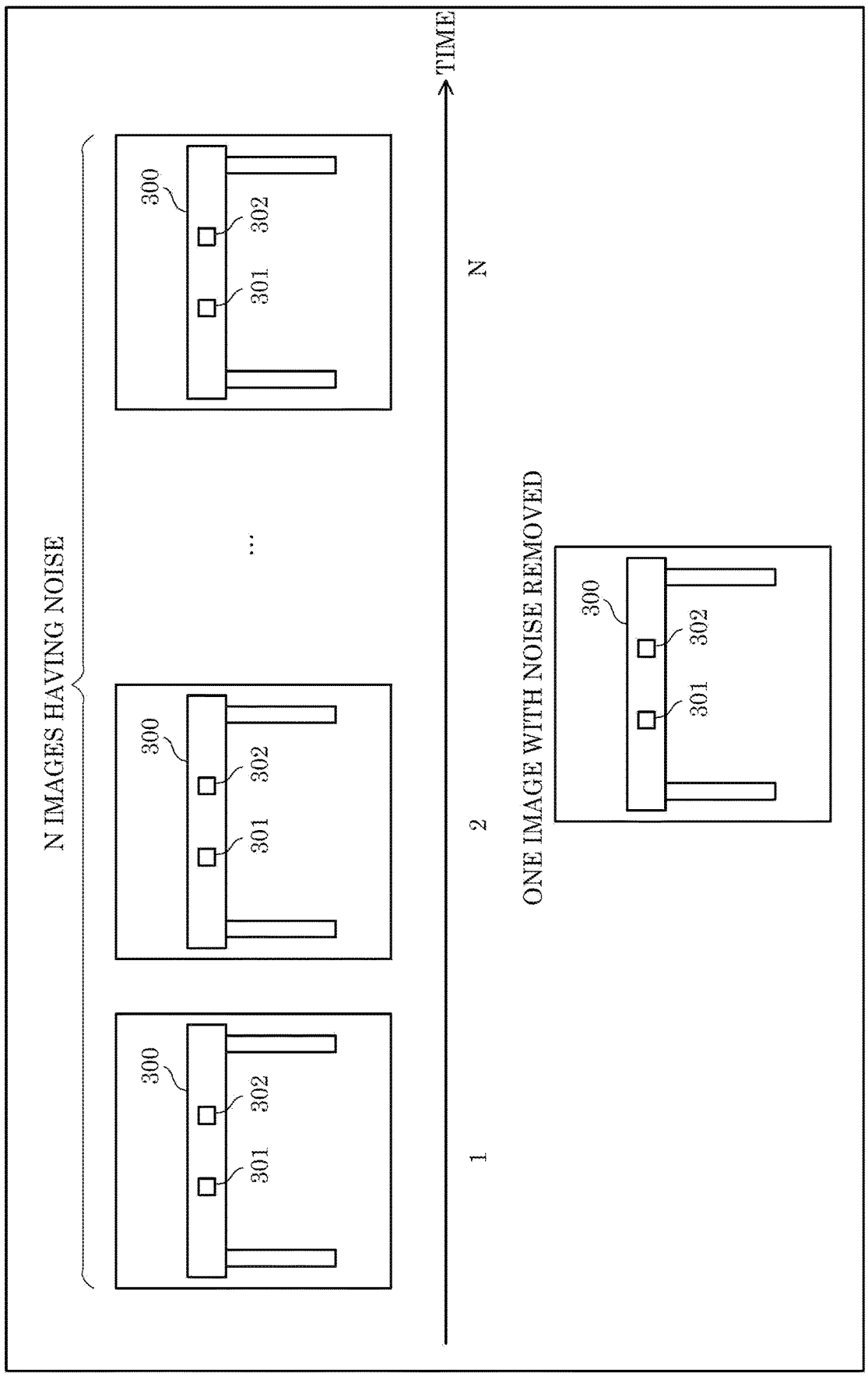
FIG. 12 is a schematic diagram illustrating an example of learning by the first machine learning model according to Embodiment 2.

FIG. 12 is a schematic diagram illustrating an example of first machine learning model 410 being trained by first trainer 470.

A specific example of the training of first machine learning model 410 by first trainer 470 will be described next with reference to FIG. 12. In this example, image capturing device 200 captures a moving image of subject 300 when there is no displacement in subject 300, i.e., when a load acting on subject 300 is not changing, and second obtainer 460 obtains N frames of the moving image captured by image capturing device 200 as the N images which contain subject 300 and have noise. Then, first trainer 470 obtains the one reference image which contains subject 300 and has had noise removed by finding an arithmetic mean of the N images which contain subject 300 and have noise.

As illustrated in FIG. 12, first trainer 470 sets, for each of the N images and the one reference image, at least one measurement point in a pixel region where subject 300 appears. In the example illustrated in FIG. 12, first trainer 470 sets measurement point 301 and measurement point 302 in each of the N images and the one reference image, in the same manner as illustrated in FIG. 4.

Then, first trainer 470 trains first machine learning model 10 with each of the N images to generate at least one image which contains subject 300 and has noise from one image which contains subject 300 and has noise, by using each of the N images as an input and using at least one of the other N−1 images as a correct answer, and by performing the training on pixels included in each of the measurement points which have been set (measurement point 301 and measurement point 302).

The following will describe first trainer 470 as training first machine learning model 410 to generate M images which contain subject 300 and have noise.

To be more specific, first trainer 470 trains second machine learning model 411 with each of the N images to generate one image which contains subject 300 and has had noise removed from one image which contains subject 300 and has noise, by using each of the N images as an input and using the one reference image obtained by second obtainer 460 as a correct answer, and by performing the training on pixels included in each of the measurement points which have been set (measurement point 301 and measurement point 302). Then, first trainer 470 trains third machine learning model 412 to generate M images which contain subject 300 and have noise from the one image which contains subject 300 and has had noise removed, by using the one reference image obtained by second obtainer 460 as an input and the N images obtained by second obtainer 460 as correct answers, and by performing the training on pixels included in each of the measurement points which have been set (measurement point 301 and measurement point 302).

2-2. Operations of Displacement Measurement Device 400

Operations performed by displacement measurement device 400 configured as described above will be described next.

Displacement measurement device 400 performs second learning processing in addition to the first displacement measurement processing performed by displacement measurement device 100 according to Embodiment 1. The second learning processing performed by displacement measurement device 400 will be described hereinafter.

The second learning processing is processing for training first machine learning model 410 to generate at least one image which contains subject 300 and has noise, from one image which contains subject 300 and has noise.

Figure 13:
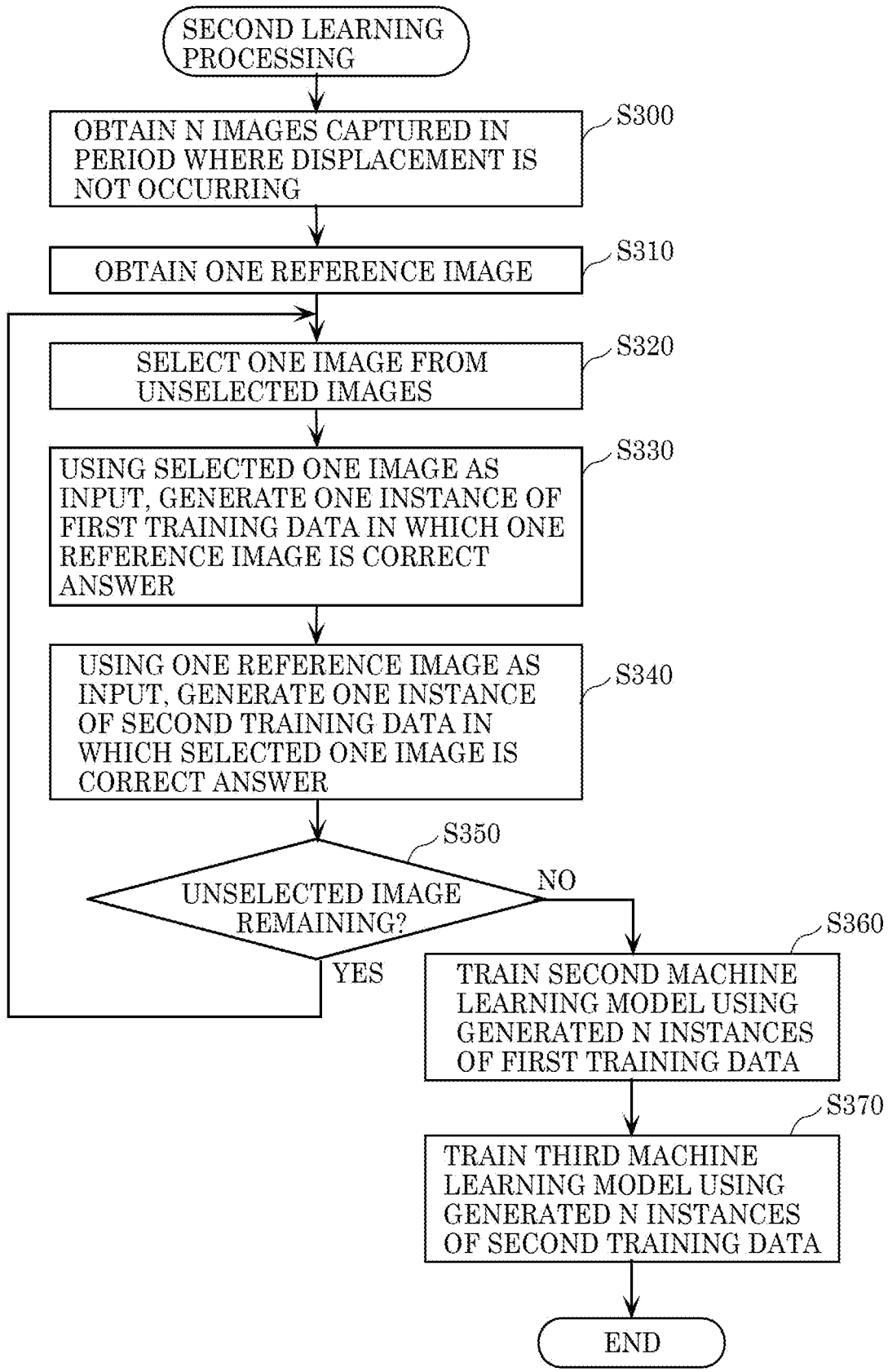
FIG. 13 is a flowchart illustrating second learning processing according to Embodiment 2.

FIG. 13 is a flowchart illustrating the second learning processing performed by displacement measurement device 400.

The second learning processing is started when a user using displacement measurement device 100 has performed an operation in displacement measurement device 100 for starting the second learning processing, when, for example, image capturing device 200 has captured a moving image of subject 300 in which there is no displacement in subject 300 and there is noise in each of the frames constituting the captured moving image.

When the second learning processing is started, second obtainer 460 obtains, from image capturing device 200, N frames of the frames constituting the moving image captured of subject 300, as the N images which contains subject 300 and have noise (step S300).

Once the N images which contain subject 300 and have noise have been obtained, second obtainer 460 obtains the one reference image which contains subject 300 and has had noise removed by finding an arithmetic mean of the N images which contain subject 300 and have noise (step S310).

Once the one reference image containing subject 300 and having noise removed has been obtained, second obtainer 460 selects one image having noise from among the N unselected images having noise (step S320). Here, "unselected image" refers to an image, in a loop from the process of step S320 to the determination of "yes" in step S350 (described later), which has not been selected in a past instance of the process of step S320.

Once one image having noise has been selected, first trainer 470 generates one instance of first training data which takes the one selected image having noise as an input and the one reference image as a correct answer (step S330). Then, first trainer 470 generates one instance of second training data which takes the one reference image as an input and the one selected image having noise as a correct answer (step S340).

Once the one instance of first training data and the one instance of second training data have been generated, first trainer 470 finds whether or not there is an unselected image among the N images having noise (step S350).

If, in the process of step S350, there is an unselected image (step S350: yes), displacement measurement device 400 moves the sequence to step S320 again.

If, in the process of step S350, there is no unselected image (step S350: no), first trainer 470 uses N instances of the first training data, obtained by repeating the loop formed by the process of step S320 to the determination of "yes" in step S350 N times, to train second machine learning model 411 to generate one image which contains subject 300 and has had noise removed from one image which contains subject 300 and has noise (step S360). Then, first trainer 470 uses N instances of the second training data, obtained by repeating the loop formed by the process of step S320 to the determination of "yes" in step S350 N times, to train third machine learning model 412 to generate M images which contain subject 300 and have noise from the one image which contains subject 300 and has had noise removed (step S370).

Once the process of step S370 ends, displacement measurement device 400 ends the second learning processing.

2-3. Effects

As described above, like displacement measurement device 100 according to Embodiment 1, displacement measurement device 400 generates the M template images which have noise from the first image which has noise, and generates the M target images which have noise from the second image which has noise. Then, displacement measurement device 400 calculates the M hypothetical displacements from the M template images having noise and the M target images having noise, and calculates the displacement of subject 300 by performing statistical processing on the calculated M hypothetical displacements. Accordingly, like displacement measurement device 100 according to Embodiment 1, displacement measurement device 400 can calculate the displacement more accurately than a past type of displacement measurement device which calculates the displacement of subject 300 directly from a first image having noise and a second image having noise, without performing statistical processing.

Embodiment 3

A displacement measurement device according to Embodiment 3, configured by changing part of the configuration of displacement measurement device 400 according to Embodiment 2, will be described next.

The displacement measurement device according to Embodiment 3 will be described hereinafter, focusing on differences from displacement measurement device 400 according to Embodiment 2.

3-1. Configuration of Displacement Measurement Device 500

Figure 14:
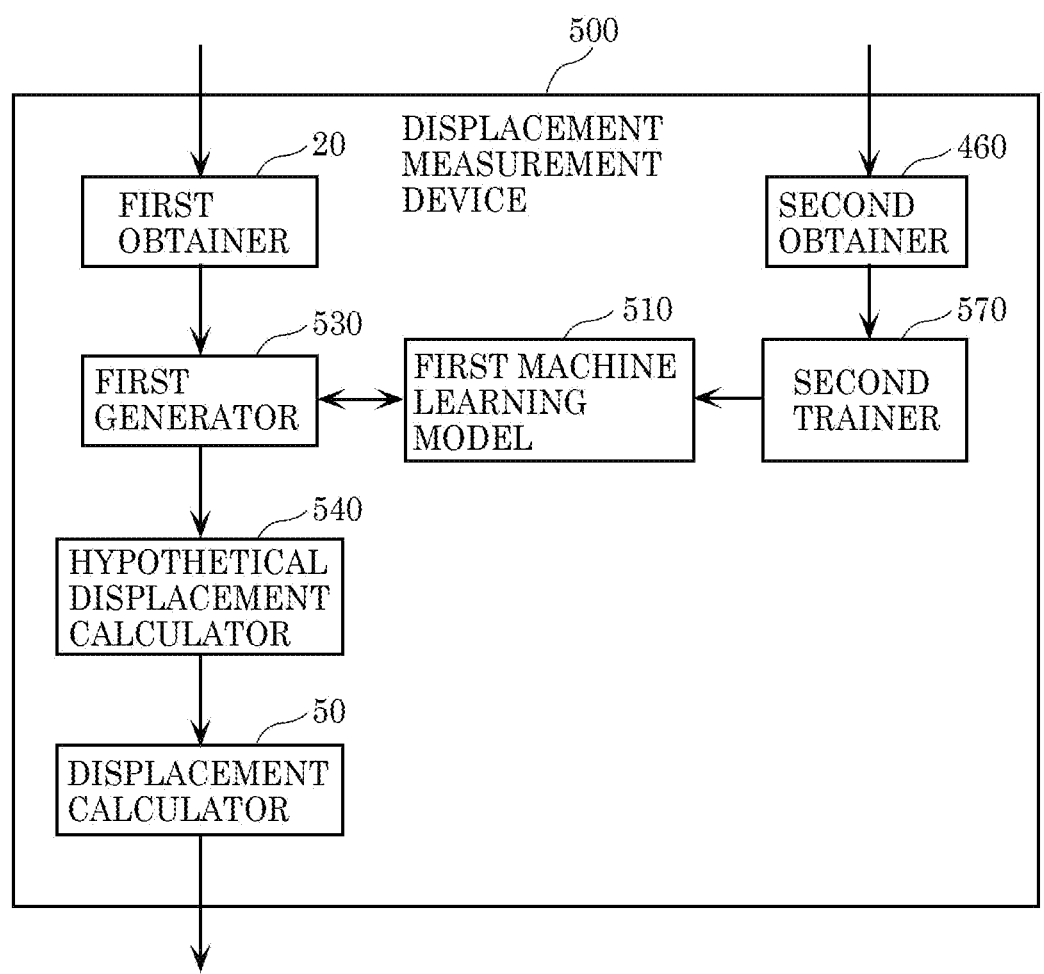
FIG. 14 is a block diagram illustrating the configuration of a displacement measurement device according to Embodiment 3.

FIG. 14 is a block diagram illustrating the configuration of displacement measurement device 500 according to Embodiment 3.

As illustrated in FIG. 14, displacement measurement device 500 is configured by changing displacement measurement device 400 according to Embodiment 2 as follows: first machine learning model 410 has been changed to first machine learning model 510; first generator 30 has been changed to first generator 530; hypothetical displacement calculator 40 has been changed to hypothetical displacement calculator 540; and first trainer 470 has been changed to second trainer 570.

First machine learning model 510 is a machine learning model trained to generate at least one image which contains subject 300 and has had noise removed, from one image which contains subject 300 and has noise. First machine learning model 510 is trained by second trainer 570.

Second trainer 570 trains first machine learning model 510 with each of the N images obtained by second obtainer 460 to generate at least one image which contains subject 300 and has had noise removed from one image which contains subject 300 and has noise, by using each of the N images as an input and using the one reference image obtained by second obtainer 460 as a correct answer.

A specific example of the training of first machine learning model 510 by second trainer 570 will be described with further reference to FIG. 12, by taking FIG. 12 as a schematic diagram illustrating an example of the training of first machine learning model 510 by second trainer 570. In this example, image capturing device 200 captures a moving image of subject 300 when there is no displacement in subject 300, i.e., when a load acting on subject 300 is not changing, and second obtainer 460 obtains N frames of the moving image captured by image capturing device 200 as the N images which contain subject 300 and have noise. Then, second obtainer 460 obtains the one reference image which contains subject 300 and has had noise removed by finding an arithmetic mean of the N images which contain subject 300 and have noise.

As illustrated in FIG. 12, second trainer 570 sets, for each of the N images and the one reference image, at least one measurement point in a pixel region where subject 300 appears. In the example illustrated in FIG. 12, second trainer 570 sets measurement point 301 and measurement point 302 in each of the N images and the one reference image, in the same manner as illustrated in FIG. 4.

Then, second trainer 570 trains first machine learning model 510 with each of the N images to generate at least one image which contains subject 300 and has had noise removed from one image which contains subject 300 and has noise, by using each of the N images as an input and using the one reference image obtained by second obtainer 460 as a correct answer, and by performing the training on pixels included in each of the measurement points which have been set (measurement point 301 and measurement point 302).

The following will describe second trainer 570 as training first machine learning model 510 to generate M images which contain subject 300 and have had noise removed. However, as another example, second trainer 570 may train first machine learning model 510 to generate one image which contains subject 300 and has had noise removed from one image which contains subject 300 and has noise, and first machine learning model 510 may generate M images which contain subject 300 and have had noise removed from one image which contains subject 300 and has noise by changing a parameter of first machine learning model 510 M times when generating the image. As still another example, second trainer 570 may train first machine learning model 510 to generate one image which contains subject 300 and has had noise removed from one image which contains subject 300 and has noise, and first machine learning model 510 may generate M images which contain subject 300 and have had noise removed from one image which contains subject 300 and has noise by using a Generative Adversarial Network (GAN) when generating the image.

Returning to FIG. 14, the descriptions of displacement measurement device 500 will be continued.

Using first machine learning model 510, first generator 530 generates M template images which contain subject 300 and have had noise removed from the first image obtained by first obtainer 20, and generates M target images which contain subject 300 and have had noise removed from the second image obtained by first obtainer 20.

First generator 530 has a similar function as first generator 30 according to Embodiment 1, but with the following changes: "M template images having noise" has been replaced with "M template images having had noise removed"; and "M target images having noise" has been replaced with "M target images having had noise removed". Further detailed descriptions of first generator 530 will therefore be considered to have already been given, and will be omitted.

Hypothetical displacement calculator 540 calculates M hypothetical displacements of subject 300 from the M template images which have had noise removed and the M target images which have had noise removed, generated by first generator 530.

Hypothetical displacement calculator 540 has a similar function as hypothetical displacement calculator 40 according to Embodiment 1, but with the following changes: "M template images having noise" has been replaced with "M template images having had noise removed", and "M target images having noise" has been replaced with "M target images having had noise removed". Further detailed descriptions of hypothetical displacement calculator 540 will therefore be considered to have already been given, and will be omitted.

3-2. Operations of Displacement Measurement Device 500

Operations performed by displacement measurement device 500 configured as described above will be described next.

Displacement measurement device 500 performs third learning processing and second displacement measurement processing. The third learning processing and the second displacement measurement processing performed by displacement measurement device 500 will be described in order hereinafter.

The third learning processing is processing in which the second learning processing according to Embodiment 2 has been partially changed, and is processing for training first machine learning model 410 to generate at least one image which contains subject 300 and has had noise removed, from one image which contains subject 300 and has noise.

Figure 15:
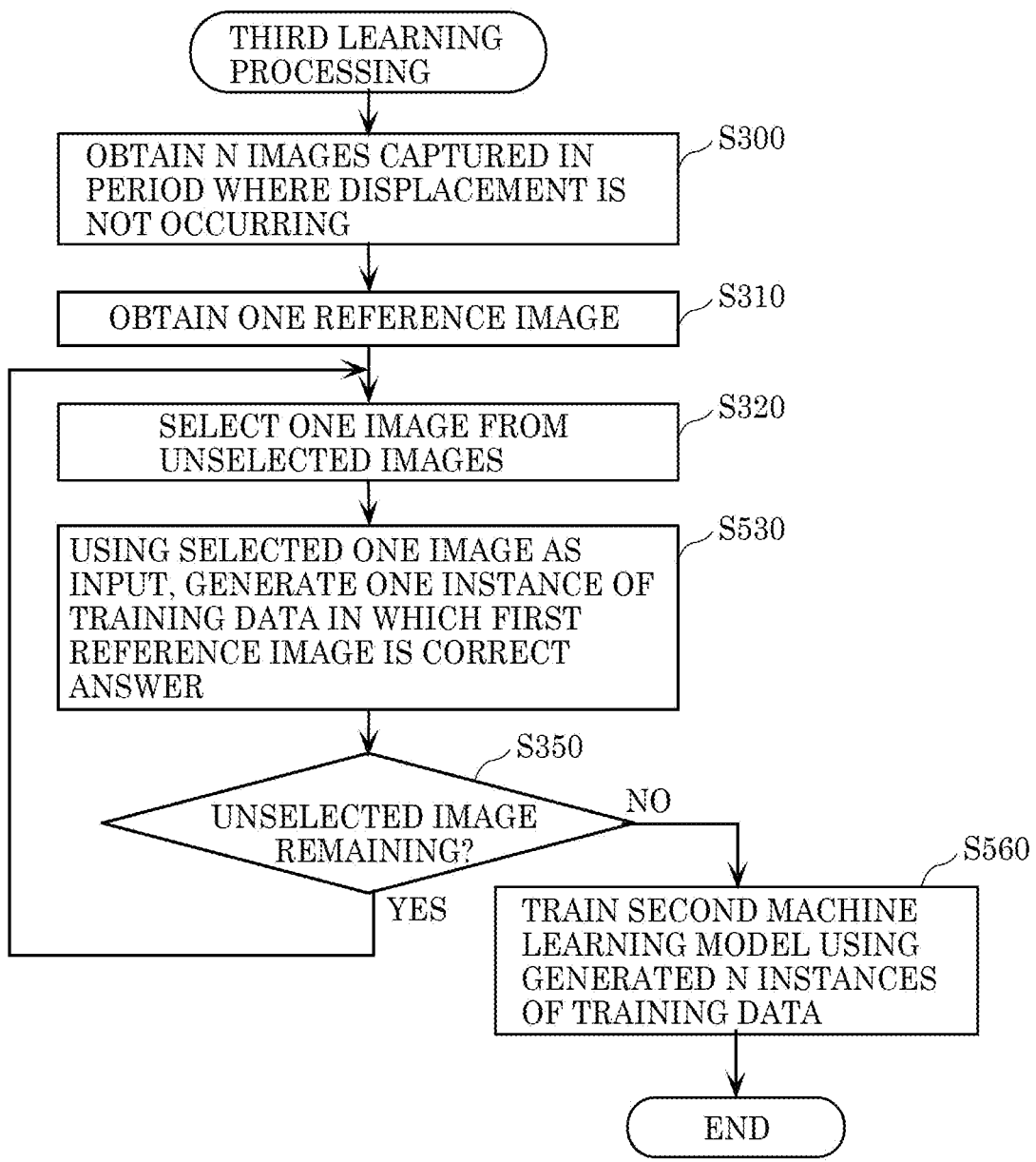
FIG. 15 is a flowchart illustrating third learning processing according to Embodiment 3.

FIG. 15 is a flowchart illustrating the third learning processing performed by displacement measurement device 500.

As illustrated in FIG. 15, compared to the second learning processing according to Embodiment 2, the third learning processing is processing in which the processes of steps S340 and S370 have been removed, the process of step S330 has been changed to the process of step S430, and the process of step S360 has been changed to the process of step S460. Accordingly, the following descriptions will focus on the processes of steps S430 and S460.

In the process of step S320, once one image having noise has been selected, second trainer 570 generates one instance of training data which takes the one selected image having noise as an input and one reference image as a correct answer (step S430). Displacement measurement device 500 then moves the processing to step S350.

If, in the process of step S350, there is no unselected image (step S350: no), second trainer 570 uses N instances of the training data, obtained by repeating the loop formed by the process of step S320 to the determination of "yes" in step S350 N times, to train first machine learning model 510 to generate one image which contains subject 300 and has had noise removed from one image which contains subject 300 and has noise (step S560).

Once the process of step S370 ends, displacement measurement device 500 ends the third learning processing.

The second displacement measurement processing is processing similar to the first displacement measurement processing according to Embodiment 1, but with the following changes: "displacement measurement device 100" has been replaced with "displacement measurement device 500"; "first machine learning model 10" has been replaced with "first machine learning model 510" "first generator 30" has been replaced with "first generator 530"; "hypothetical displacement calculator 40" has been replaced with "hypothetical displacement calculator 540"; "M template images having noise" has been replaced with "M template images having had noise removed"; and "M target images having noise" has been replaced with "M target images having had noise removed".

Further detailed descriptions of the second displacement measurement processing will therefore be considered to have already been given, and will be omitted.

3-3. Effects

As described above, displacement measurement device 500 generates the M template images which have had noise removed from the first image which has noise, and generates the M target images which have had noise removed from the second image which has noise. Then, displacement measurement device 500 calculates the M hypothetical displacements from the M template images having had noise removed and the M target images having had noise removed, and calculates the displacement of subject 300 by performing statistical processing on the calculated M hypothetical displacements. Accordingly, displacement measurement device 500 can calculate the displacement more accurately than a past type of displacement measurement device which calculates the displacement of subject 300 directly from a first image having noise and a second image having noise, without generating images from which noise has been removed.

Embodiment 4

A displacement measurement device according to Embodiment 4, configured by changing part of the configuration of displacement measurement device 100 according to Embodiment 1, will be described next.

The displacement measurement device according to Embodiment 4 will be described hereinafter, focusing on differences from displacement measurement device 100 according to Embodiment 1.

4-1. Configuration of Displacement Measurement Device 600

Figure 16:
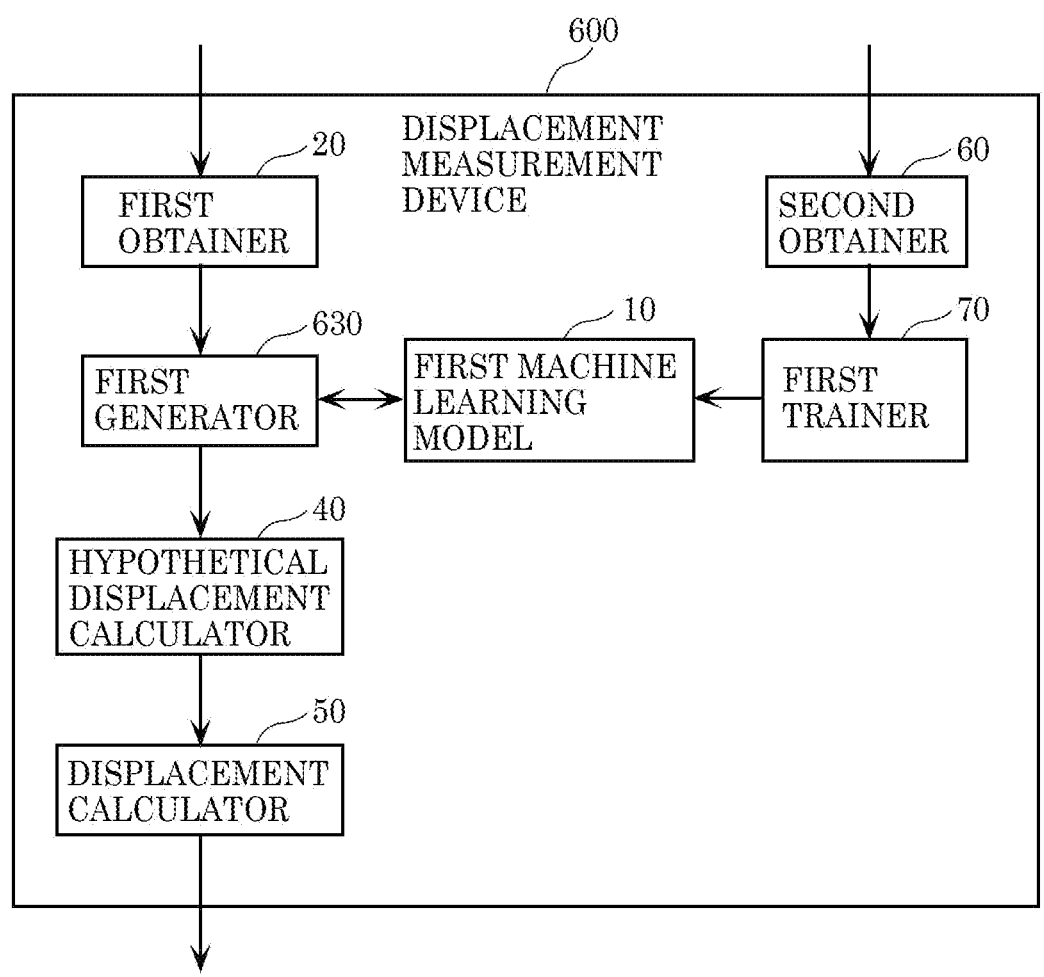
FIG. 16 is a block diagram illustrating the configuration of a displacement measurement device according to Embodiment 4.

FIG. 16 is a block diagram illustrating the configuration of displacement measurement device 600 according to Embodiment 4.

As illustrated in FIG. 16, displacement measurement device 600 is configured by changing displacement measurement device 100 according to Embodiment 1 as follows: first generator 30 has been changed to first generator 630.

Like first generator 30 according to Embodiment 1, using first machine learning model 10, first generator 630 generates M template images which contain subject 300 and have noise from the first image obtained by first obtainer 20, and generates M target images which contain subject 300 and have noise from the second image obtained by first obtainer 20. The methods through which first generator 630 generates the M template images and the M target images are different from those of first generator 30 according to Embodiment 1.

Figure 17:
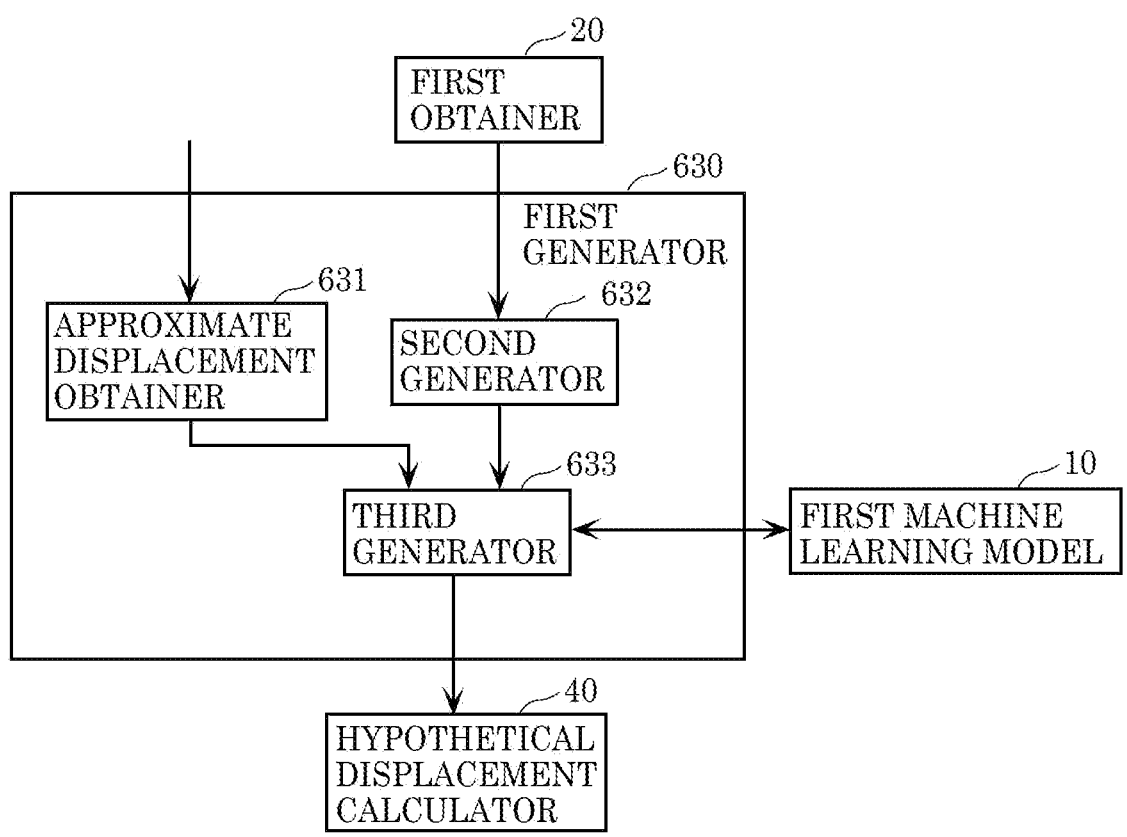
FIG. 17 is a block diagram illustrating the configuration of a first generator according to Embodiment 4.

FIG. 17 is a block diagram illustrating the configuration of first generator 630.

As illustrated in FIG. 17, first generator 630 is configured including approximate displacement obtainer 631, second generator 632, and third generator 633.

Approximate displacement obtainer 631 obtains an approximate displacement of subject 300. Here, the "approximate displacement" of subject 300 is a displacement of subject 300 which is calculated in advance and is not necessarily highly-accurate. For example, the approximate displacement of subject 300 may be a displacement calculated by a past type of displacement measurement device which calculates the displacement of subject 300 directly from a first image having noise and a second image having noise, without generating images from which noise has been removed.

Second generator 632 generates a first pixel-relocated image by relocating at least one pixel of the first image obtained by first obtainer 20 an amount based on the approximate displacement obtained by approximate displacement obtainer 631, and generates a second pixel-relocated image by relocating at least one pixel of the second image obtained by first obtainer 20 an amount based on the approximate displacement obtained by approximate displacement obtainer 631.

Using first machine learning model 10, third generator 633 generates M template images which contain subject 300 and have noise from the first pixel-relocated image generated by second generator 632, and generates M target images which contain subject 300 and have noise from the second pixel-relocated image generated by second generator 632.

4-2. Effects

When the displacement of subject 300 is relatively high, skew in pixels included in the measurement points may exceed the ranges of the measurement points.

In response to this, even if skew in pixels included in the measurement points exceeds the ranges of the measurement points, displacement measurement device 600 can use the approximate displacement to generate the first pixel-relocated image, in which the skew in pixels included in the measurement points does not exceed the ranges of the measurement points, from the first image, and to generate the second pixel-relocated image, in which the skew in pixels included in the measurement points does not exceed the ranges of the measurement points, from the second image. Then, using first machine learning model 10, displacement measurement device 600 generates the M template images from the first pixel-relocated image and the M target images from the second pixel-relocated image. In this manner, even if the displacement of subject 300 is relatively high, displacement measurement device 600 can accurately calculate the displacement of subject 300.

Note that the displacement of subject 300 calculated by displacement measurement device 600 is a difference between the approximate displacement obtained by approximate displacement obtainer 631 and an actual displacement of subject 300. Thus to calculate the actual displacement of subject 300, it is necessary to add the approximate displacement obtained by approximate displacement obtainer 631 to the displacement of subject 300 calculated by displacement measurement device 600.

OTHER EMBODIMENTS

Although one or more aspects of a displacement measurement device according to the present disclosure have been described thus far on the basis of Embodiments 1 to 4, the present disclosure is not intended to be limited to these embodiments. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

(1) Embodiment 1 describes a configuration in which displacement measurement device 100 includes, for example, second obtainer 60 that obtains N images which contain subject 300 and which have noise, and first trainer 70 that trains first machine learning model 10 using the N images obtained by second obtainer 60. However, as another example, displacement measurement device 100 may have a configuration in which second obtainer 60 and first trainer 70 are omitted, and first machine learning model 10 is not trained. In this case, displacement measurement device 100 may use, for example, a trained first machine learning model 10 which has been trained in advance by an external device or the like.

(2) Embodiment 1 describes the subject to be measured as a bridge, as one example. However, the subject to be measured need not be limited to a bridge. For example, the subject to be measured may be a structure aside from a bridge, such as a building or a steel tower, or may be a road surface, a ball, an animal, or the like. When the subject to be measured is a subject which moves, such as a ball or an animal, "displacement of the subject" may be interpreted as meaning "movement of the subject".

(3) In Embodiment 1, displacement measurement device 100 is described as being implemented in, for example, a computer device including a processor and memory, by the processor executing a program stored in the memory. However, as another example, displacement measurement device 100 may be implemented in a computer system constituted by a plurality of computer devices, each of which includes a processor and memory and which are communicably connected to each other, through distributed computing or cloud computing.

(4) Embodiment 1 describes a configuration in which, for example, displacement measurement device 100 does not include image capturing device 200. However, as another example, displacement measurement device 100 may be configured including image capturing device 200. In this case, image capturing device 200 functions as an image capturer that is a part of displacement measurement device 100.

(5) In Embodiment 1, some or all of the constituent elements included in displacement measurement device 100 may be implemented by a single integrated circuit through system LSI (Large-Scale Integration).

"System LSI" refers to very-large-scale integration in which multiple constituent elements are integrated on a single chip, and specifically, refers to a computer system configured including a microprocessor, read-only memory (ROM), random access memory (RAM), and the like. A computer program is stored in the ROM. The system LSI circuit realizes the functions of the constituent elements by the microprocessor operating in accordance with the computer program.

Note that although the term "system LSI" is used here, other names, such as IC. LSI, super LSI, ultra LSI, and so on may be used, depending on the level of integration. Furthermore, the manner in which the circuit integration is achieved is not limited to LSI, and it is also possible to use a dedicated circuit or a generic processor. It is also possible to employ a Field Programmable Gate Array (FPGA) which is programmable after the LSI circuit has been manufactured, or a reconfigurable processor in which the connections and settings of the circuit cells within the LSI circuit can be reconfigured.

Furthermore, if other technologies that improve upon or are derived from semiconductor technology enable integration technology to replace LSI circuits, then naturally it is also possible to integrate the function blocks using that technology. Biotechnology applications are one such foreseeable example.

(6) Aspects of the present disclosure are not limited to the displacement measurement devices according to Embodiments 1 to 4, and may be realized as a displacement measurement method which implements the characteristic constituent elements included in the displacement measurement device as steps. Additionally, aspects of the present disclosure may be realized as a computer program that causes a computer to execute the characteristic steps included in such a displacement measurement method. Furthermore, aspects of the present disclosure may be realized as a computer-readable non-transitory recording medium in which such a computer program is recorded.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in displacement measurement devices that measure displacement of a subject to be measured.

What is claimed is:

1. A displacement measurement device, comprising:
a first machine learning model trained to generate, from one image which contains a subject to be measured and has noise, at least one image which contains the subject and which has noise or has had noise removed;
a first obtainer that obtains a first image which contains the subject and has noise and a second image which contains the subject and has noise;
a first generator that, using the first machine learning model, generates M template images containing the subject from the first image and generates M target images containing the subject from the second image, M being an integer of 2 or higher;
a hypothetical displacement calculator that calculates M hypothetical displacements of the subject from the M template images and the M target images; and
a displacement calculator that calculates a displacement of the subject by performing statistical processing on the M hypothetical displacements.

2. The displacement measurement device according to claim 1,
wherein the at least one image generated by the first machine learning model is an image having noise, and the displacement measurement device further comprises:
a second obtainer that obtains N images which contain the subject and have noise, N being an integer of 2 or higher; and
a first trainer that trains the first machine learning model with each of the N images by using each of the N images as an input and using at least one of N−1 other images as a correct answer.

3. The displacement measurement device according to claim 2,
wherein the first machine learning model includes:
a second machine learning model trained to generate, from one image which contains the subject and has noise, one noise-removed image which has had noise removed; and
a third machine learning model trained to generate, from the one noise-removed image, at least one image which contains the subject and has noise,
the second obtainer further obtains one reference image which contains the subject and does not have noise, and
the first trainer trains the first machine learning model by training the second machine learning model with each of the N images by using each of the N images as an input and using the one reference image as a correct answer, and training the third machine learning model by using the one reference image as an input and using at least one of N−1 other images as a correct answer.

4. The displacement measurement device according to claim 1,
wherein the at least one image generated by the first machine learning model is an image having had noise removed, and
the displacement measurement device further comprises:
a second obtainer that obtains N images which contain the subject and have noise and one reference image which contains the subject and does not have noise, N being an integer of 2 or higher; and
a second trainer that trains the first machine learning model with each of the N images by using each of the N images as an input and using the one reference image as a correct answer.

5. The displacement measurement device according to claim 1, wherein the first generator includes:

an approximate displacement obtainer that obtains an approximate displacement of the subject;

a second generator that generates a first pixel-relocated image by relocating at least one pixel of the first image an amount based on the approximate displacement, and generates a second pixel-relocated image by relocating at least one pixel of the second image an amount based on the approximate displacement; and a third generator that, using the first machine learning model, generates the M template images from the first pixel-relocated image and generates the M target images from the second pixel-relocated image.

6. A displacement measurement method, comprising:

obtaining a first image which contains a subject to be measured and has noise and a second image which contains the subject and has noise;

generating M template images which contain the subject from the first image, and M target images which contain the subject from the second image, using a first machine learning model trained to generate at least one image which contains the subject and which has noise or has had noise removed from one image which contains the subject and has noise, M being an integer of 2 or higher;

calculating M hypothetical displacements of the subject from the M template images and the M target images; and calculating a displacement of the subject by performing statistical processing on the M hypothetical displacements.

* * * * *